(12) United States Patent
Kawaguchi et al.

(10) Patent No.: US 8,799,573 B2
(45) Date of Patent: Aug. 5, 2014

(54) STORAGE SYSTEM AND ITS LOGICAL UNIT MANAGEMENT METHOD

(75) Inventors: Yutaro Kawaguchi, Odawara (JP); Koji Nagata, Kaisei (JP)

(73) Assignee: Hitachi, Ltd., Tokyo (JP)

( * ) Notice: Subject to any disclaimer, the term of this patent is extended or adjusted under 35 U.S.C. 154(b) by 386 days.

(21) Appl. No.: 13/201,842

(22) PCT Filed: Jul. 22, 2011

(86) PCT No.: PCT/JP2011/004156
§ 371 (c)(1),
(2), (4) Date: Aug. 16, 2011

(87) PCT Pub. No.: WO2013/014699
PCT Pub. Date: Jan. 31, 2013

(65) Prior Publication Data
US 2013/0024616 A1 Jan. 24, 2013

(51) Int. Cl.
*G06F 12/00* (2006.01)
(52) U.S. Cl.
USPC .............................. 711/114; 711/156; 711/173
(58) Field of Classification Search
None
See application file for complete search history.

(56) References Cited

U.S. PATENT DOCUMENTS

| 2004/0221102 A1* | 11/2004 | Watanabe ..................... 711/112 |
| 2006/0010290 A1 | 1/2006 | Sasamoto |
| 2008/0065829 A1 | 3/2008 | Inoue et al. |
| 2009/0300316 A1 | 12/2009 | Shinohara |
| 2010/0228917 A1 | 9/2010 | Ikeuchi et al. |
| 2010/0325339 A1* | 12/2010 | Ogawa et al. ................. 711/103 |
| 2011/0099321 A1* | 4/2011 | Haines et al. ................. 711/103 |

FOREIGN PATENT DOCUMENTS

| JP | 2006-114064 A | 4/2006 |
| JP | 2008-065706 A | 3/2008 |

OTHER PUBLICATIONS

International Search Report on international application No. PCT/JP2011/004156, mailed on Apr. 11, 2012.
Written Opinion of the International Searching Authority in international application No. PCT/JP2011/004156.

* cited by examiner

*Primary Examiner* — Matthew Bradley
*Assistant Examiner* — Daniel Tsui
(74) *Attorney, Agent, or Firm* — Hitachi America, Ltd.

(57) ABSTRACT

The size of management information pages for storing format management information is minimized and a management size of the management information pages is reduced.
A storage system has a controller(s) for managing an area of a management-information logical unit, which stores format management information to manage whether an access-target logical unit has been formatted or not, by using a former page area and a latter page area, wherein when formatting the access-target logical unit, the controller: calculates a capacity of the format management information based on a capacity of the access-target logical unit; calculates the number of management information pages according to a ratio of the calculated capacity of the format management information to a page management unit; allocates the format management information of one page to the former page area and manages its storage location by using a former page area address; and allocates the format management information of two or more pages to the latter page areas and manages their storage locations by using latter page area addresses and a page length.

12 Claims, 24 Drawing Sheets

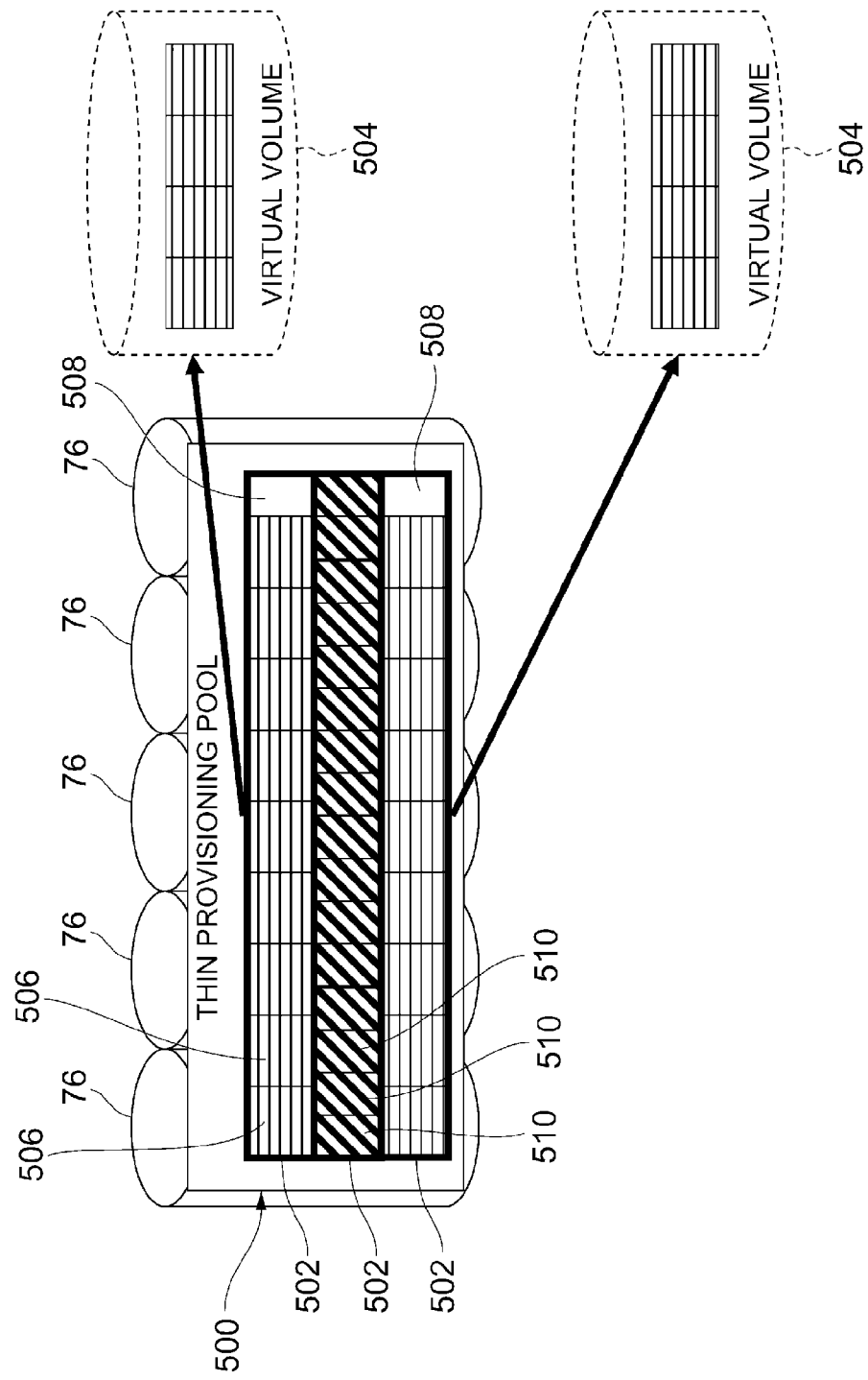

STORAGE SYSTEM AND ITS LOGICAL UNIT MANAGEMENT METHOD

TECHNICAL FIELD

The present invention relates to a storage system for managing logical units formed in storage areas of a plurality of storage devices, and a logical unit management method for such a storage system.

BACKGROUND ART

Recently, a storage system that handles large-scale data expands the functions of the storage system itself in order to store daily increasing large-capacity data in a large number of hard disk drives (HDD). Accordingly, the number of logical volumes formed in physical storage areas of the large number of hard disk drives is also increased. If the number of the logical volumes increases, it is necessary to also increase management information for managing the logical volumes. The management information of the logical volumes is normally stored in a semiconductor memory; however, the semiconductor memory has a small capacity and is expensive.

So, the management information of the logical volumes is stored in a RAID (Redundant Array of Inexpensive Disks) composed of low-price hard disk drives, thereby expanding the scale of the storage system at low cost (see Patent Literature 1).

Meanwhile, in a case of a storage system having a plurality of storage control devices, hard disk drives are accessed by each storage control device, so that access exclusion is required. Regarding a method of exclusive control between controllers, for example, there is a suggested method of allocating part of a cache memory and logical volumes to each controller and thereby eliminating exclusive control between controllers over the cache memory (see Patent Literature 2).

CITATION LIST

Patent Literature

PTL 1: Japanese Patent Application Laid-Open (Kokai) Publication No. 2008-065706
PTL 2: Japanese Patent Application Laid-Open (Kokai) Publication No. 2006-114064

SUMMARY OF INVENTION

Technical Problem

Patent Literature 2 adopts a method of managing a storage area of the cache memory by dividing it into segments. However, when this method is applied to a method for managing storage areas of storage units such as hard disk drives (HDDs) constituting a RAID, if the storage areas of the storage units such as the hard disk drives (HDDs) constituting a RAID are divided by a specified management unit (page) and managed, the following problem occurs.

For example, if the management information of the logical volumes is stored on a page basis, the management information definitely needs allocation of a one-page storage area as a storage area for storing the management information no matter how small the management information is. Accordingly, if small management information is stored in a page-based storage area when the page size is large, a useless storage area occurs. Conversely, if the management information is large and the page size is small, the number of pages for storing the management information increases.

The present invention was devised in light of the problems of the above-described conventional technology and it is an object of the invention to provide a storage system and its logical unit management method capable of minimizing the size of management information pages for storing format management information and reducing a management size of the management information page.

Solution to Problem

In order to achieve the above-described object, a storage system according to the present invention has one or more controllers for managing an area of a management-information logical unit for storing format management information to manage whether one or more access-target logical units, each of which is a logical unit formed in a storage area of a plurality of storage devices and is an access target of an access requestor, have been formatted or not, by dividing the area of the management-information logical unit into a former page area and a latter page area, wherein when executing the format processing on the access-target logical unit, the controller: calculates a capacity of the format management information based on a capacity of the access-target logical unit; calculates, according to a ratio of the calculated capacity of the format management information to a page management unit with a specified capacity, the number of management information pages necessary to manage the format management information using the management unit; allocates part of the format management information, from among the format management information corresponding to the calculated number of the management information pages, to the former page area; allocates the remaining format management information, from among the format management information corresponding to the calculated number of the management information pages, to the latter page area; and stores an execution result of the format processing as the format management information in the former page area or the latter page area. Under this circumstance, the controller can manage a storage location of the format management information allocated to the former page area by using former page area addresses and manage a storage location of the format management information allocated to the latter page area by using latter page area addresses and a page length.

Advantageous Effects of Invention

According to the present invention, the size of management information pages for storing format management information can be minimized and a management size of the management information page can be reduced.

BRIEF DESCRIPTION OF DRAWINGS

FIG. 31 is a configuration diagram of a second embodiment in a case where a difference bitmap table is stored in a thin provisioning pool.

DESCRIPTION OF EMBODIMENTS (Overview of the Invention)

When constructing, for example, user volumes in a RAID composed of a plurality of storage units, format processing such as quick format processing is executed by, for example, a controller on a storage area of each storage unit.

Figure 1:
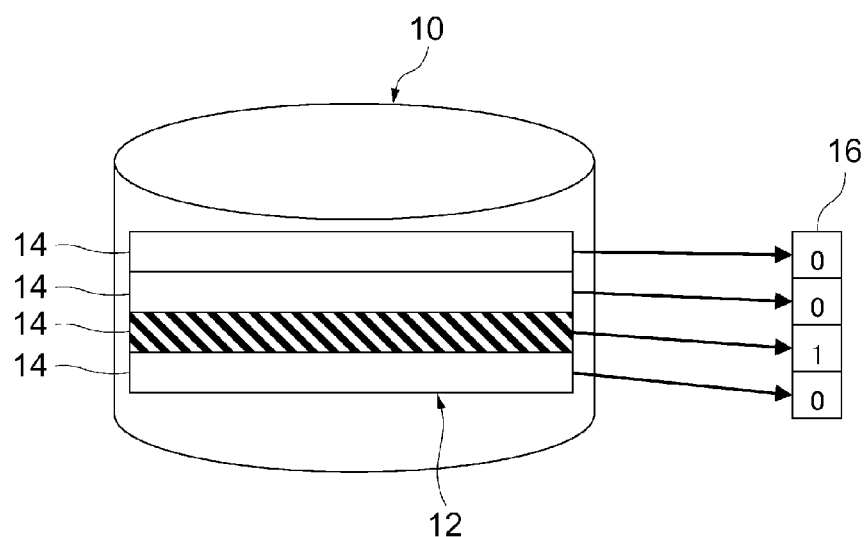
FIG. 1 is a configuration diagram explaining the relationship between a normal LU and a difference bitmap table.

Under this circumstance, as shown in FIG. 1, a quick format target area 12 in a normal LU 10, which is a target LU of quick format processing and is configured in a RAID, is divided into a plurality of quick format target areas 14 in 1-MB quick format management units and whether each quick format target area 14 has been formatted or not is managed by using a difference bitmap table 16 (a table for registering, with difference bits, format management information for managing whether the normal LU 10 indicating the access-target logical unit has been formatted or not, shall be hereinafter referred to as the "difference bitmap table").

If the quick format target area 14 has been formatted in the above-described case, "0" is stored in a difference bitmap table 16 corresponding to this quick format target area 14; and if the quick format target area 14 is in a state of not being formatted, "1" is stored in the difference bitmap table 16 corresponding to this quick format target area 14.

In other words, whether each quick format target area 14 has been formatted or not is managed with the difference bitmap table 16, using a 1-bit difference bit.

If the size of the normal LU 10 is 7680 TB, the capacity of the difference bitmap table 16 would be approximately 1 GB.

Many semiconductor memories are required in order to store 1-GB data in the semiconductor memories.

Specifically speaking, when format processing of a storage unit is executed, the capacity of the difference bitmap table in which the managing information for managing whether formatting has been performed or not, with respect to each logical unit (hereinafter sometimes referred to as the LU (Logical Unit)), is to be registered would be 1 bit per 1-MB (megabyte) LU. Accordingly, if the total capacity of all LUs which are quick format targets is 7680 TB (terabytes), the capacity of the difference bitmap table for all the LUs would be approximately 1 GB (giga bytes).

If whether or not the format processing has been executed on each LU is managed with the difference bitmap table by applying 1 GB/(Page Management Unit)=the Number of Management Information Pages, the number of the management information pages increases as the page management unit decreases.

For example, the simplest management method is considered on the premise that the maximum capacity per LU is 128 TB and a maximum of 4096 LUs exist. If a management method for managing all management information pages allocated per LU is adopted, the size of the difference bitmap table would be as described below, assuming that management information (address information) of one management information page is 4 bytes.

Firstly, the size of the difference bitmap table for the maximum capacity 128 TB would be 16 MB. Specifically speaking, 128 TB is divided by 1 MB, which is a bitmap management unit, and then a value obtained by the division is managed, using 1 bit per 1 MB; and if the value obtained by the division is managed by converting it into bytes, the size of the difference bitmap table for managing the LU information with capacity of 128 TB would be 16 MB.

If the management unit is small and the page management unit is 4 MB, the number of the management information pages capable of storing the 16-MB difference bitmap table is four management information pages.

Since the management information of one management information page is 4 bytes, the amount of information required to manage the four management information pages is 16 bytes.

The memory size required to manage the 16-Byte information amount for 4096 LUs is 64 KB.

Next, when the page management unit is 1 MB, the number of management information pages capable of storing the 16-MB difference bitmap table is 16 management information pages.

The amount of information required to manage the 16 management information pages is 16*4 bytes=64 bytes.

The memory size required to manage the 64-byte information amount for 4096 LUs is 256 KB.

Specifically speaking, as the management unit becomes smaller, the number of the management information pages increases and the memory size required to store the management information increases accordingly.

On the other hand, when the page management unit is large, for example, if the page management unit is 10 MB and the capacity of a quick format target LU is 128 TB, the number of the management information pages required to store the 16-MB difference bitmap table is 16 MB/10 MB=1.6. If the fractional part is rounded up, the required number of the management information pages to store the difference bitmap table would be two management information pages.

Specifically speaking, when the size of the difference bitmap table is 16 MB, the calculated number of the management information pages required to store the above capacity is 1.6 pages. However, since the management information pages are managed on the basis of each management information page, the number of pages required to store the difference bitmap table would be two management information pages. As a result, there will be an unused storage area in the last management information page of the two management information pages. As a result, the larger the page management unit is, the more useless storage areas which will not be actually used will occur.

Figure 2:
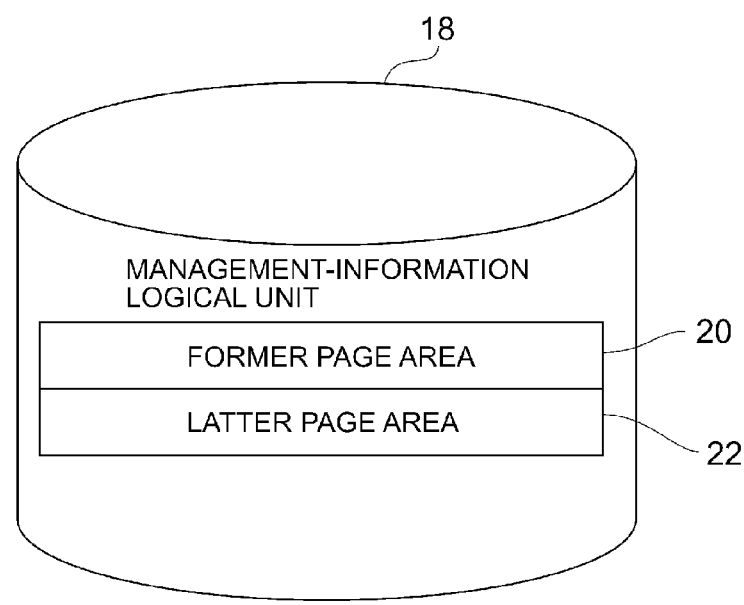
FIG. 2 is a configuration diagram of a management information LU.

So, a management information LU 18 is formed as an LU for storing data of the difference bitmap table 16 in a RAID group composed of a plurality of storage units as shown in FIG. 2 and the data of the difference bitmap table 16 is stored in the management information LU 18.

Under this circumstance, an area of the management information LU 18 is divided into a former page area 20 and a latter page area 22.

When storing the data of the difference bitmap table 16 in the management information LU 18, the data of the difference bitmap table 16 is information of each LU and the size of the difference bitmap table 16 corresponding to each LU changes depending on the LU structure. Therefore, it is necessary to divide the data of the difference bitmap table 16 into data for each LU in order to store the data of the difference bitmap table 16 in the management information LU 18.

So the capacity of the difference bitmap table 16 is managed by using management information pages obtained by dividing the capacity of the difference bitmap table 16 by a specified capacity, for example, a 1-MB page management unit. Under this circumstance, the management information pages are set to an integral multiple of a stripe string size that is a minimum unit of read access or write access.

Then, an area calculated from a capacity obtained by multiplying the maximum number of pages of user volumes in a RAID by a page size (size of the management information page) is allocated to the former page area 20 in the management information LU 18.

Also, an area required as the management information which is calculated from the total size of the RAID group is allocated to the latter page area 22.

Subsequently, during the process of dividing the normal LU 10 into a plurality of LUs and using them, the number of pages required to store the data of the difference bitmap table 16 is calculated with respect to each LU on the basis of the capacity of the divided LUs. If the calculated number of pages is two or more, the data of the difference bitmap table 16 corresponding to the first page is allocated to the former page area 20 and the data of the difference bitmap table 16 corresponding to the second or subsequent pages to the latter page area 22.

Under this circumstance, storage locations of data allocated to the former page area 20 are managed by using former page area addresses and storage locations of data allocated to the latter page area 22 is managed by using latter page area addresses and a page length of the pages allocated to the latter page area 22.

Figure 3:
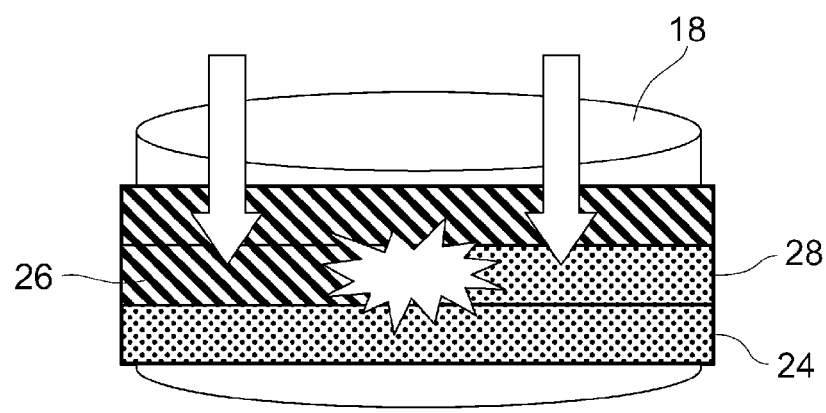
FIG. 3 is a configuration diagram explaining processing when accesses to controllers compete with each other.

Furthermore, when data 26, 28 of different pages exist in a plurality of stripe strings 24 formed in the management information LU 18 as shown in FIG. 3 and a method of deciding one controller in charge for each page is adopted, and if two controllers (storage control devices) access the same stripe string 24, access competition occurs.

Figure 4:
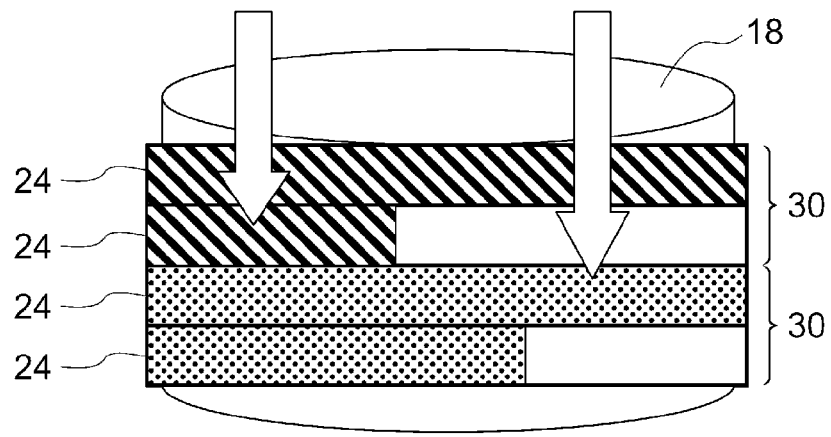
FIG. 4 is a configuration diagram of a management information LU to which a stripe string is allocated for each management unit.

Then, as shown in FIG. 4, an integral multiple of a stripe string 24 constructed in the management information LU 18 is recognized as a management information page 30; the stripe strings 24 constructed in the management information LU 18 are gathered and managed for each management information page 30; and a controller in charge is set to each management information page 30. For example, ownership information indicating exclusive ownership of access to the management information page 30 is stored in the management information page 30 by associating such ownership information with any of the controllers. As a result, it is possible to prevent the occurrence of access competition between the controllers.

First Embodiment

This embodiment is configured so that a storage system has a controller for managing an area of a management-information logical unit, which stores format management information to manage whether an access-target logical unit has been formatted or not, by using a former page area and a latter page area; wherein when formatting the access-target logical unit, this controller: calculates a capacity of the format management information based on a capacity of the access-target logical unit; calculates the number of management information pages according to a ratio of the calculated capacity of the format management information to a page management unit; allocates the format management information of a first page to the former page area and manages its storage location by using a former page area address; and allocates the format management information of a second or subsequent pages to the latter page area and manages its storage locations by using latter page area addresses and a page length.

A first embodiment of the present invention will be explained below with reference to the attached drawings.

Figure 5:
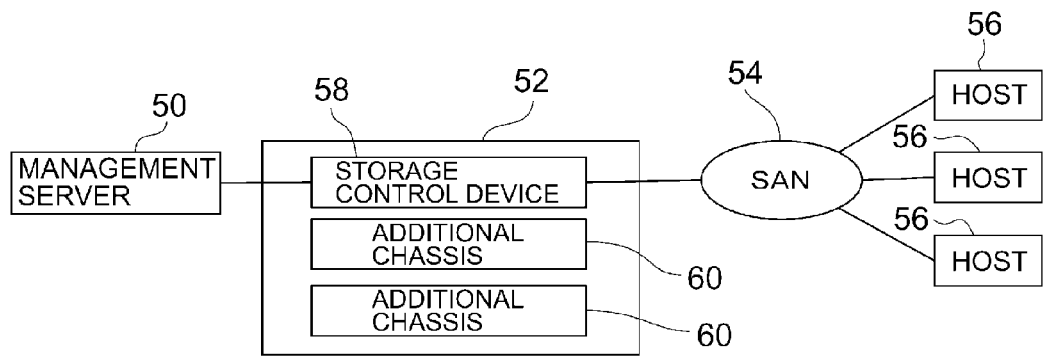
FIG. 5 is a configuration diagram showing an overall configuration of a computer system.

FIG. 5 is a block diagram showing the overall configuration of a computer system. Referring to FIG. 5, the computer system includes a management server 50, a disk array apparatus 52, a network 54, and a plurality of host computers (hereinafter sometimes referred to as the "hosts") 56.

Each host 56 is a computer device equipped with information processing resources such as a CPU (Central Processing Unit) and a memory, and is composed of, for example, a personal computer, a workstation, or a mainframe. Each host 56 can access LUs or logical volumes provided by the disk array apparatus (storage subsystem) 52 by issuing an access request, for example, a write request or a read request, which designates the LUs or the logical volumes, to the disk array apparatus (storage subsystem) 52.

Furthermore, each host 56 is equipped with information input devices (not shown in the drawing) such as a keyboard, a switch, a pointing device, and/or a microphone, and information output devices (not shown in the drawing) such as a monitor display and a speaker.

The network 54 is composed of, for example, a SAN (Storage Area Network), a LAN (Local Area Network), the Internet, public lines, or private lines. If the network 54 is a SAN, communication between each host 56 and the disk array apparatus 52 via this network 54 is performed according to a Fibre Channel protocol. If the network 54 is a LAN, communication between each host 56 and the disk array apparatus 52 via this network 54 is performed according to TCP/IP (Transmission Control Protocol/Internet Protocol).

The disk array apparatus 52 is configured as a storage system having a storage control device 58 and a plurality of additional chassis (extended chassis) 60.

Figure 6:
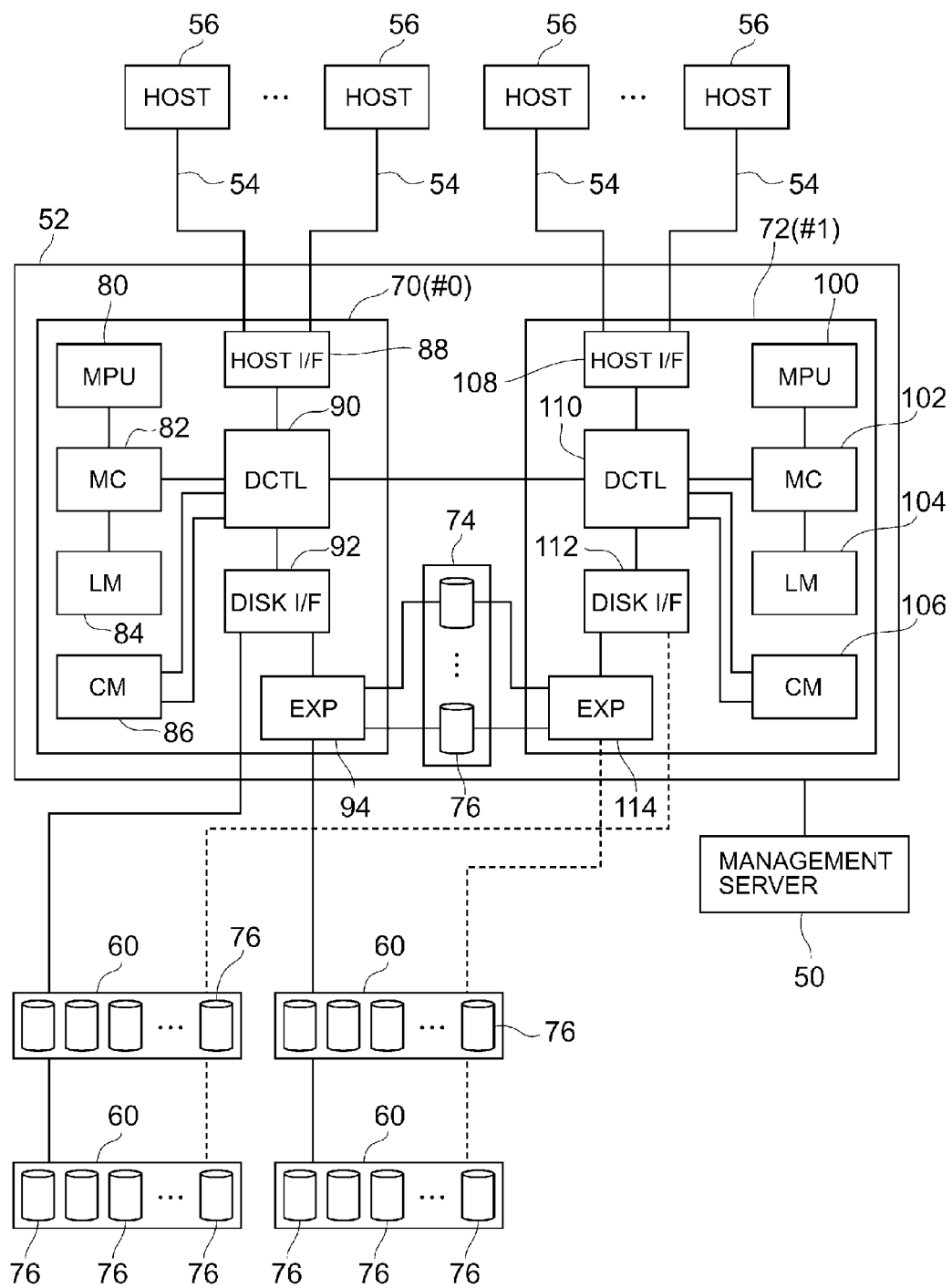
FIG. 6 is an internal configuration diagram of a disk array apparatus.

Next, FIG. 6 shows an internal configuration diagram of the disk array apparatus.

Referring to FIG. 6, the disk array apparatus 52 includes a storage control device 58 having a plurality of controllers 70, 72 and a basic chassis 74, and the basic chassis 74 contains a plurality of storage devices 76. Incidentally, each additional chassis 60 also contains a plurality of storage devices 76.

Examples of the storage devices 76 may include storage units such as hard disk devices, semiconductor memory devices, optical disk devices, magneto-optical disk devices, magnetic tape devices, and flexible disk devices; and these storage units are devices capable of reading and writing data.

If hard disk devices are used as the storage units, for example, FC (Fibre Channel) disks, SCSI (Small Computer System Interface) disks, SATA (Serial ATA) disks, ATA (AT Attachment) disks, or SAS (Serial Attached SCSI) disks can be used.

If semiconductor memory devices are used as the storage units, for example, SSD (Solid State Drive) (flash memory), FeRAM (Ferroelectric Random Access Memory), MRAM (Magnetoresistive Random Access Memory), phase-change memory (Ovonic Unified Memory), or RRAM (Resistance Random Access Memory) can be used.

Furthermore, each storage unit 76 can constitute a RAID group such as RAID4, RAID5, or RAID6 and each storage unit 76 can be divided into a plurality of RAID groups. Under this circumstance, a plurality of logical units (LUs) or a plurality of logical volumes can be formed in a physical storage area of each storage unit 76.

LUs are logical units provided as access targets of the host 56 to the host 56 and are classified into normal LUs and virtual LUs.

A normal LU is composed of a logical storage area formed in the storage device 76. On the other hand, a virtual LU is provided by a Thin Provisioning function and is composed of a storage area unit called a "page." Before initial data of the created virtual LU is written, the page is not associated with a logical storage area formed of a physical storage area. Then, after new data is written to the page, a storage area which is part of a logical storage area formed in the storage device 76 is allocated to the page, to which the data is written, and the data will be stored in this allocated storage area.

A normal LU or a virtual LU is assigned an LUN (Logical Unit Number) as its identifier and each segment is assigned an LBA (Logical Block Address). Under this circumstance, each host 56 can access data stored in a storage area corresponding to a normal LU or a virtual LU by sending a command including a logical address composed of the identifier LUN and the logical block address LBA, to the controller 70 or the controller 72 for the disk array apparatus 52.

The controller 70 is configured as controller #0 including an MPU 80, a memory controller (MC) 82, a local memory (LM) 84, a cache memory (CM) 86, a host interface 88, a data transfer control circuit (DCTL) 90, a disk interface 92, and an expander (EXP) 94.

The MPU 80 is composed of a microprocessor for supervising and controlling the entire controller 70 and this microprocessor is composed of, for example, multiple cores.

The memory controller 82 executes, for example, mapping processing on the local memory 84 in response to a command from the MPU 80.

The local memory 84 is configured as a storage device for storing system configuration information, management information, and various control programs.

The cache memory 86 is configured as a storage device for temporarily storing, for example, user data input to, and/or output from, the disk array apparatus 52.

The host interface 88 is equipped with a port (not shown) for connecting the disk array apparatus 52 to the network 54, interprets various commands sent from each host 56, executes processing in accordance with commands, and sends data to, or receives data from, each host 56.

The data transfer control circuit 90 is connected to the memory controller 82, the cache memory 86, the host interface 88, the disk interface 92, and the data transfer control circuit 110 and controls data transfer to these connected components.

The disk interface 92 functions as an interface for sending data to, or receiving data from, the storage devices 76 placed in the additional chassis 60 or the expander 94 and performing protocol control during communication.

Under this circumstance, the disk interface 92 reads data from the storage devices 76 in the basic chassis 74 or from the storage devices 76 in the additional chassis 60 via the expander 94 on the basis of read access from the MPU 80, and transfers each read data to the data transfer control circuit 90. Furthermore, the disk interface 92 stores write data to the storage devices 76 in the basic chassis 74 or the storage devices 76 in the additional chassis 60 via the expander 94 on the basis of write access from the MPU 80.

The expander 94 is connected to the disk interface 92 and also to the storage devices 76 in the basic chassis 74 and the storage devices 76 in the additional chassis 60 and is configured as a branch circuit for making data from the disk interface 92 branch into the basic chassis 74 or the additional chassis 60.

The controller 72 is configured as controller #1 including an MPU 100, a memory controller (MC) 102, a local memory (LM) 104, a cache memory (CM) 106, a host interface 108, a data transfer control circuit (DCTL) 110, a disk interface 112, and an expander (EXP) 114.

The MPU 100 is composed of a microprocessor for supervising and controlling the entire controller 72 and this microprocessor is composed of, for example, multiple cores.

The memory controller 82 executes, for example, mapping processing on the local memory 104 in response to a command from the MPU 100.

The local memory 104 is configured as a storage device for storing system configuration information, management information, and various control programs.

The cache memory 106 is configured as a storage device for temporarily storing, for example, user data input to, and/or output from, the disk array apparatus 52.

The host interface 108 is equipped with a port (not shown) for connecting the disk array apparatus 52 to the network 54, interprets various commands sent from each host 56, executes processing in accordance with commands, and sends data to, or receives data from, each host 56.

The data transfer control circuit 110 is connected to the memory controller 102, the cache memory 106, the host interface 108, the disk interface 112, and the data transfer control circuit 90 and controls data transfer to these connected components.

The disk interface 112 functions as an interface for sending data to, or receiving data from, the storage devices 76 placed in the additional chassis 60 or the expander 114 and performing protocol control during communication.

Under this circumstance, the disk interface 112 reads data from the storage devices 76 in the basic chassis 74 or from the storage devices 76 in the additional chassis 60 via the expander 114 on the basis of read access from the MPU 100, and transfers each read data to the data transfer control circuit 110. Furthermore, the disk interface 112 stores write data to the storage devices 76 in the basic chassis 74 or the storage devices 76 in the additional chassis 60 via the expander 114 on the basis of write access from the MPU 110.

The expander 114 is connected to the disk interface 112 and also to the storage devices 76 in the basic chassis 74 and the storage devices 76 in the additional chassis 60 and is configured as a branch circuit for making data from the disk interface 112 branch into the basic chassis 74 or the additional chassis 60.

Figure 7:
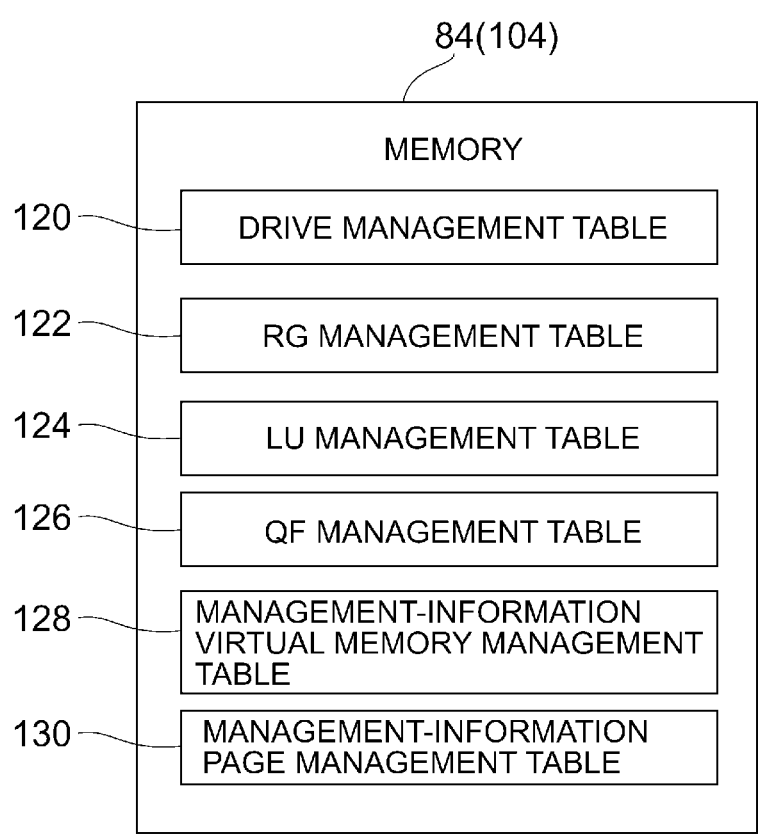
FIG. 7 is a configuration diagram of a local memory.

Next, FIG. 7 shows a configuration diagram of the local memory.

Referring to FIG. 7, the local memory 84, 104 stores a drive management table 120, an RG (RAID group) management table 122, an LU management table 124, a QF (quick format) management table 126, a management-information virtual memory management table 128, and a management-information page management table 130.

Figure 8:
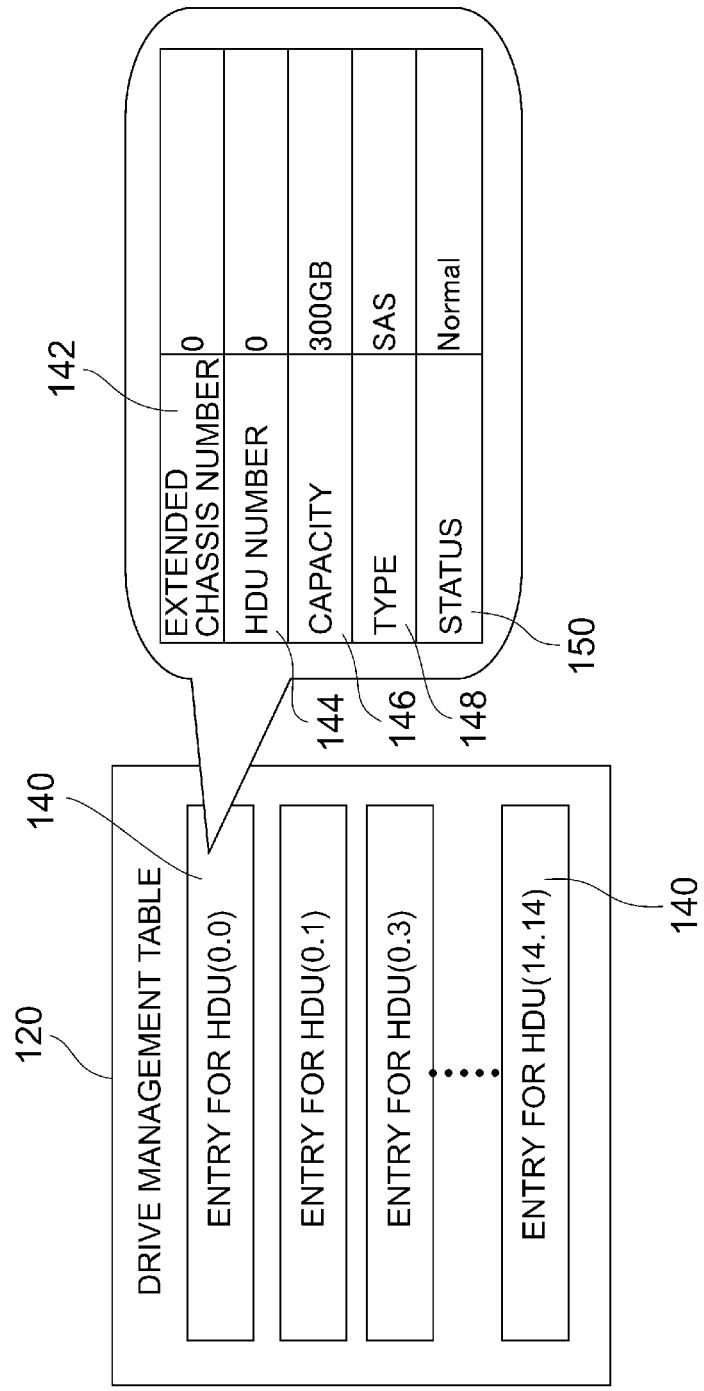
FIG. 8 is a configuration diagram of a drive management table.

Next, FIG. 8 shows a configuration diagram of the drive management table.

Referring to FIG. 8, the drive management table 20 is a table for managing the storage devices 76 placed in the basic chassis 74 or the additional chassis 76 and includes a plurality of HDU (Hard Disk Unit) entries 140. Each HDU entry 140 stores information about an additional chassis number (extended chassis number) 142, an HDU number 144, a capacity 146, a type 148, and the status 150.

For example, the additional chassis number (extended chassis number) 142 stores, for example, "0" as the number of the additional chassis 76. The HDU number 144 stores, for example, "0" as the number of the relevant HDU. The capacity 146 stores, for example, "300 GB" as the capacity of the relevant HDU. The type 148 stores, for example, "SAS" as the type of the relevant storage device 76.

The status 150 stores "Normal" if the status of the relevant storage device 76 is normal.

Figure 9:
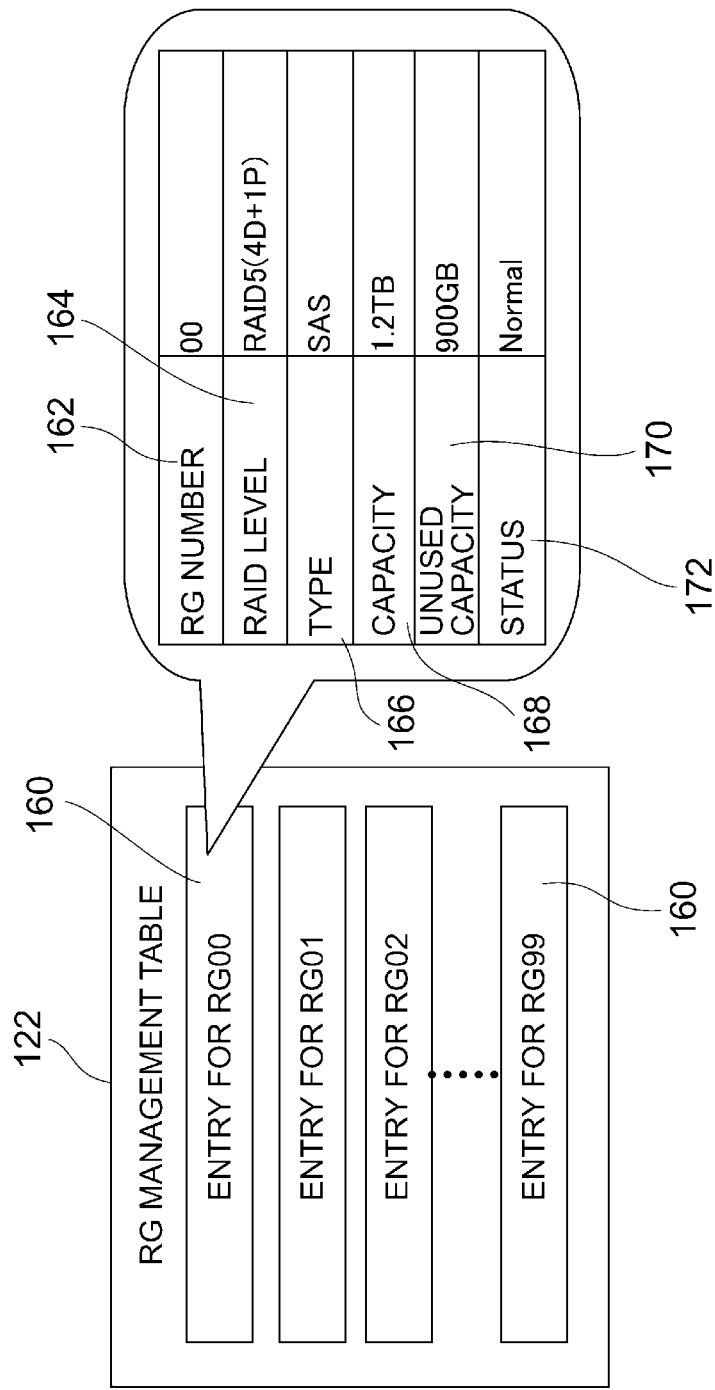
FIG. 9 is a configuration diagram of an RG management table.

Next, FIG. 9 shows a configuration diagram of the RG management table.

Referring to FIG. 9, the RG management table 122 is a table for managing the storage devices 76 constituting a RAID group and includes a plurality of RG entries 160. Each entry 160 stores information about an RG number 162, a RAID level 164, a type 166, a capacity 168, an unused capacity 170, and the status 172.

For example, the RG number 162 stores "00" as the number of the relevant RAID group and the RAID level 164 stores "RAID 5(4D+1P)."

The type 166 stores "SAS" as the type of the relevant storage device 76. The capacity 168 stores "1.2 TB" as the capacity of the relevant RAID group. The unused capacity 170 stores "900 GB" as an unused capacity. The status 172 stores "Normal" when the status of the relevant RAID group is normal and the RAID group has been formatted.

Figure 10:
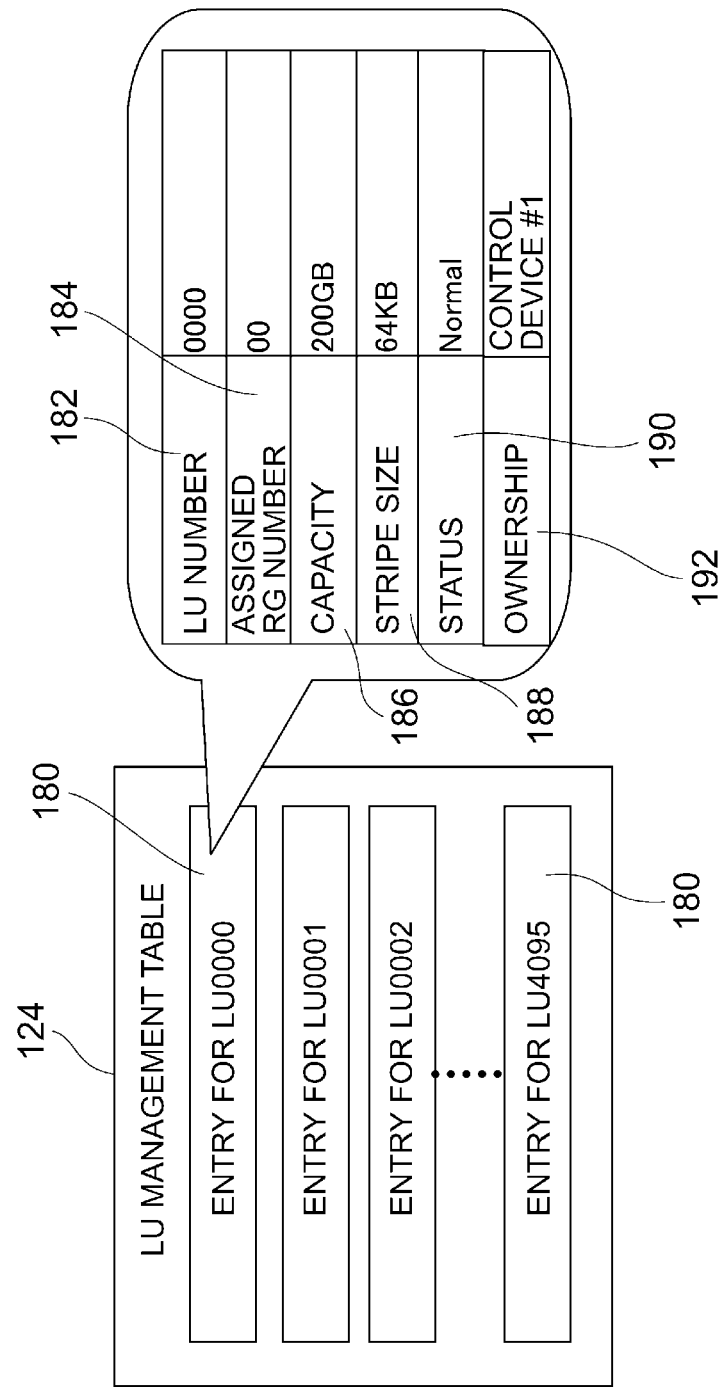
FIG. 10 is a configuration diagram of an LU management table.

Next, FIG. 10 shows a configuration diagram of the LU management table 124.

Referring to FIG. 10, the LU management table 124 is a table for managing target LUs, which are quick format targets, and includes a plurality of LU entries 180.

Each LU entry 180 stores information about an LU number 182, an assigned RG number 184, a capacity 186, a stripe size 188, the status 190, and ownership 192.

For example, the LU number 182 stores "0000" as the number for identifying a target LU which is a quick format target. The assigned RG number 184 stores "00" as the number of an RG to which the target LU belongs. The capacity 186 stores "200 GB" as the capacity of the target LU. The stripe size 188 stores "64 KB" as the size of a stripe string allocated to the target LU.

The status 190 stores "Normal" if the status of the target LU is normal. The ownership 192 stores information about a controller or cores (cores constituting the MPU 80 or the MPU 100) which exclusively own the access right to the target LU. For example, the ownership 192 stores the "control device #1" in a case of the controller 72 or the "control device #0" in a case of the controller 70.

Figure 11:
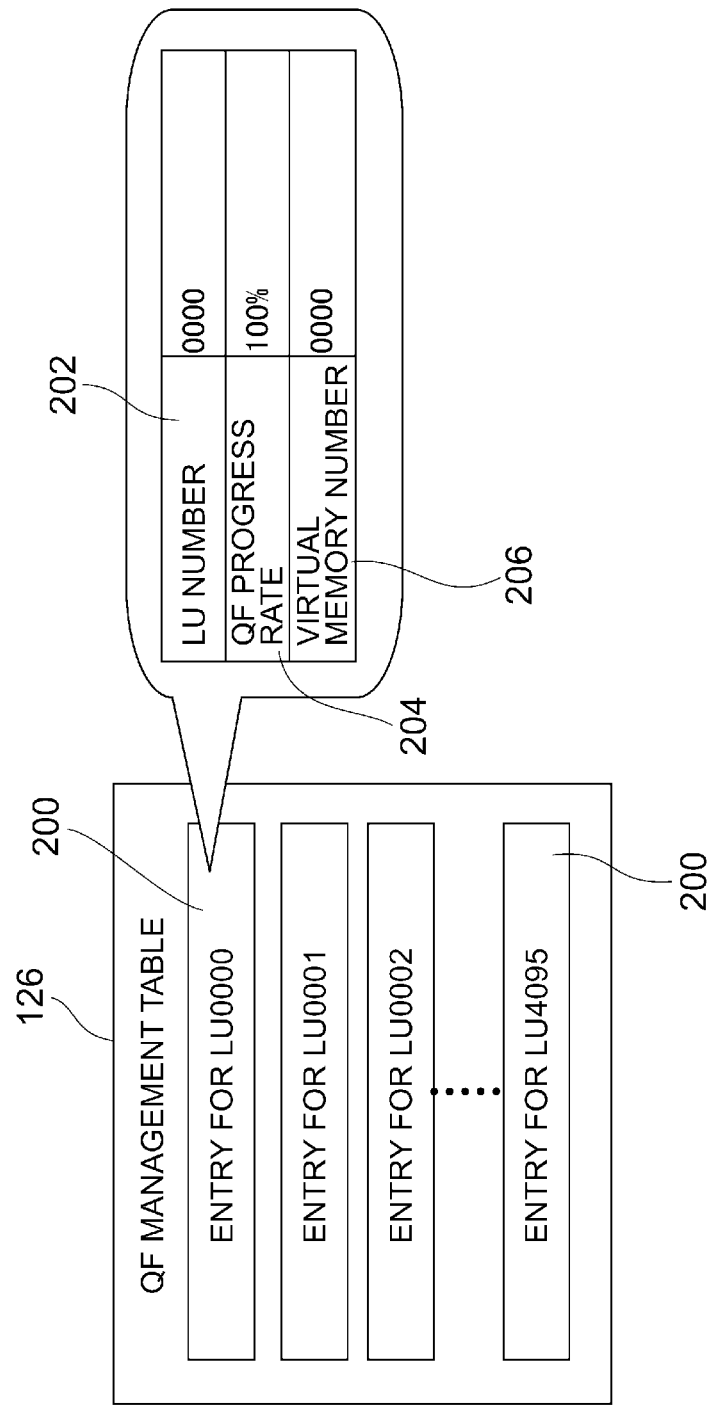
FIG. 11 is a configuration diagram of a QF management table.

Next, FIG. 11 shows a configuration diagram of the QF management table 126.

Referring to FIG. 11, the QF management table 126 is a table for managing the status of quick formatting and the progress of quick formatting and includes a plurality of LU entries 200. Each LU entry 200 stores information about an LU number 202 of a target LU which is a quick format target, a QF progress rate 204 of the target LU, and a virtual memory number 206.

For example, the LU number 202 stores "0000" as the number of a target LU which is a quick format target. The QF progress rate 204 stores "100%" as a quick format progress rate of the target LU, which is the quick format target, when the quick formatting is completed.

The virtual memory number 206 stores, for example, "0000" as the number for access to the management-information virtual memory management table 128.

Figure 12:
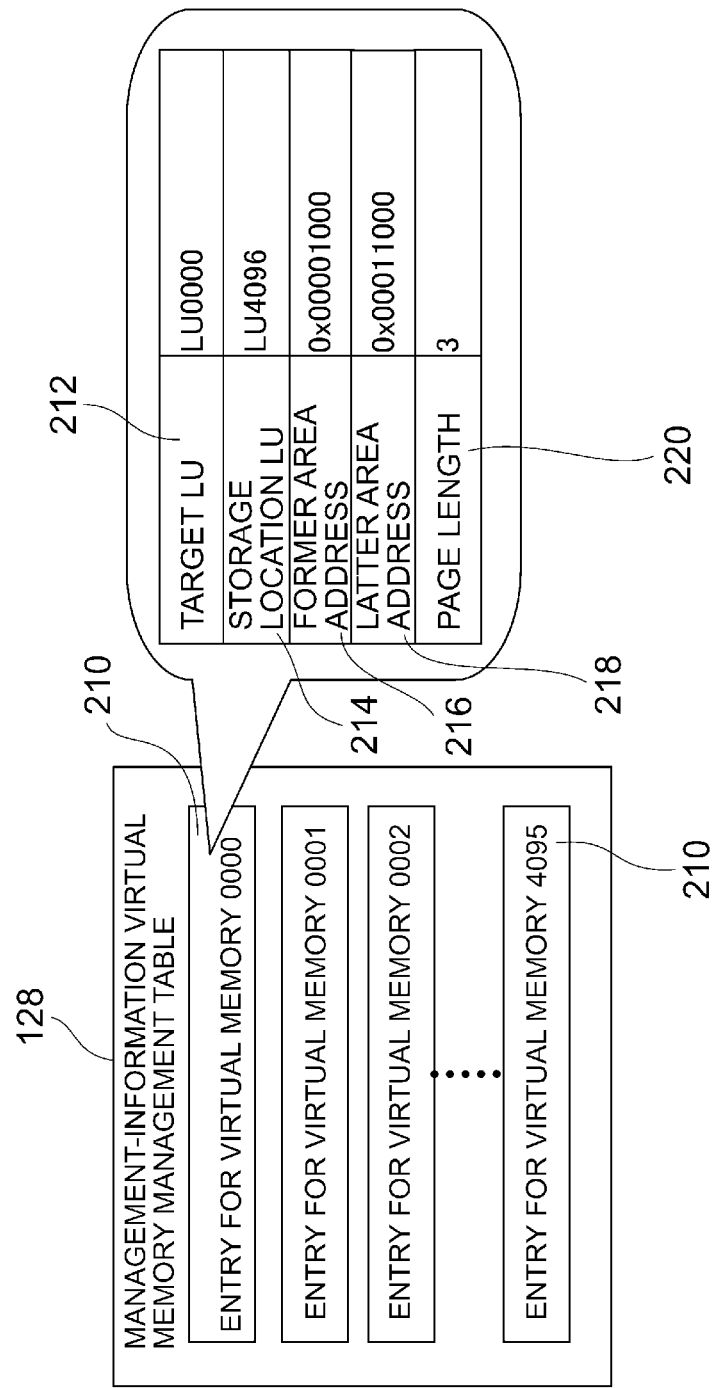
FIG. 12 is a configuration diagram of a management-information virtual memory management table.

Next, FIG. 12 shows a configuration diagram of the management-information virtual memory management table 128.

Referring to FIG. 12, the management-information virtual memory management table 128 is a table for managing the difference bitmap table 16 stored in the management information LU 18 and includes a plurality of virtual memory entries 210. Each virtual memory entry 210 stores information about a target LU 212, a storage location LU 214, a former page area address 216, a latter page area address 218, and a page length 220.

For example, the target LU 212 stores "LU0000" as information for identifying a target LU which is a quick format target.

The storage location LU 214 stores "LU4096" as information for identifying the management information LU 18 which stores the difference bitmap table 16.

The former page area address 216 stores, for example, "0x00001000" as an address assigned to the former page area 20.

The latter page area address 218 stores, for example, "0x00011000" as an address assigned to the latter page area 22.

The page length 220 stores, for example, "3" as information about the length of a page(s) allocated to the latter page area 22 when the length of pages allocated to the latter page area 22 is a 3-page length.

Figure 13:
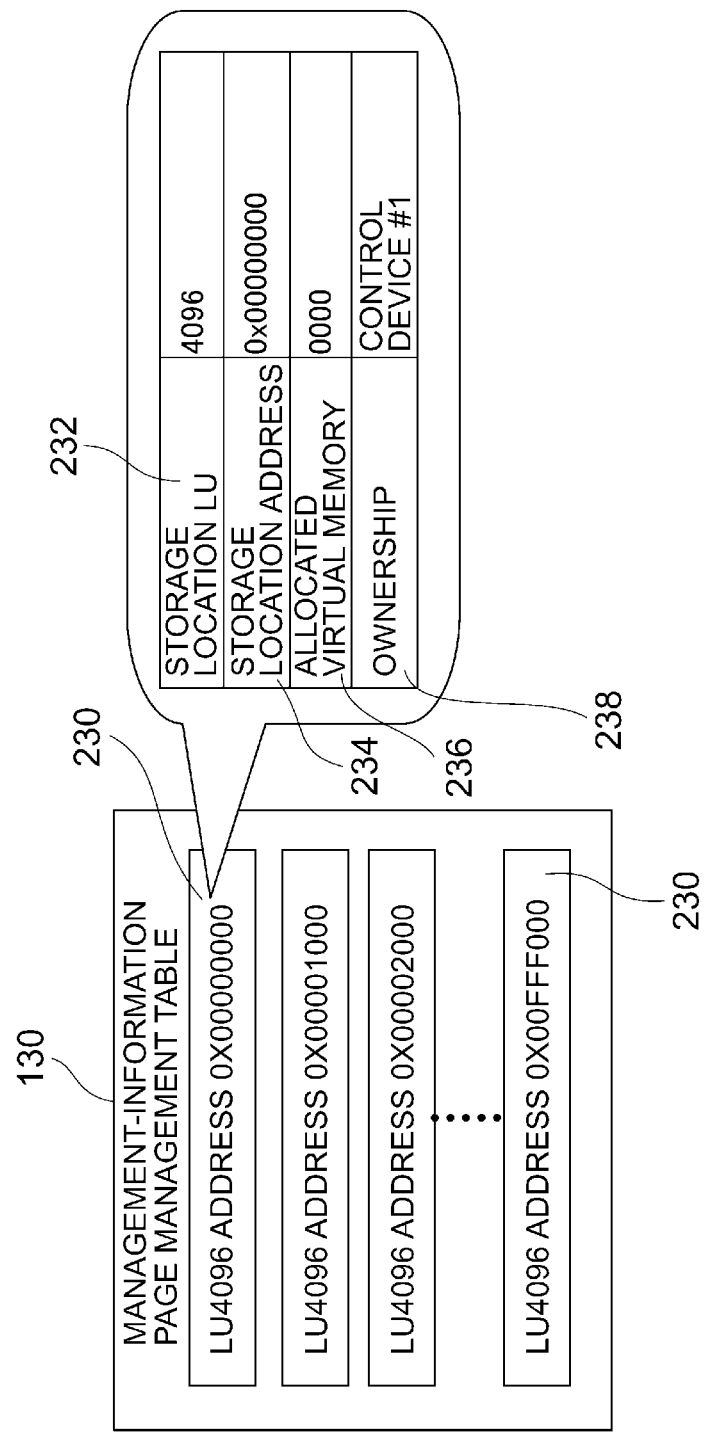
FIG. 13 is a configuration diagram of a management-information page management table.

Next, FIG. 13 shows a configuration diagram of the management-information page management table 130.

Referring to FIG. 13, the management-information page management table 130 is a table for managing an area of the management information LU 18 in units of the management information pages 30 (management information page units)

and includes a plurality of LU 4096 addresses 230. Addresses "0x00000000" to "0x00FFF000" are assigned as the LU 4096 addresses 230.

Each LU 4096 address 230 stores information about a storage location LU 232, a storage location address 234, an allocated virtual memory 236, and ownership 238.

The storage location LU 232 stores, for example, "4096" as the number of the storage location LU where the difference bitmap table 16 is stored.

The storage location address 234 stores, for example, "0x00000000" as an address corresponding to the LU 4096 address 230.

The allocated virtual memory 236 stores, for example, "0000" as information for identifying the virtual memory entry 210 of the management-information virtual memory management table 128.

The ownership 238 stores information about the controller or cores (cores constituting the MPU 80 or the MPU 100) which exclusively own the storage location LU. For example, the ownership 238 stores the "control device #1" in a case of the controller 72 or the "control device #0" in a case of the controller 70.

Next, quick format processing will be explained with reference to a flowchart in FIG. 14.

This processing is started when the management server 50 gives instruction to the controller 70 or the controller 72 to execute the quick format processing.

For example, when the management server 50 gives instruction to the controller 70 to execute the quick format processing, the MPU 80 for the controller 70 transfers a request to prohibit processing for, for example, changing the configuration, as inter-controller exclusion processing, to the controller 72 via the data transfer control circuit 90 (S11).

Subsequently, the MPU 80 executes processing for updating information of the QF management table 126 (S12).

For example, the MPU 80 executes processing for initializing, for example, the QF progress rate 204 of the QF management table 126.

Next, the MPU 80 executes processing for securing an area for storing the difference bitmap table 116 (S13).

Then, the MPU 80 executes processing for registering the quick format processing result in the cache memories 86, 106 (S14).

Subsequently, the MPU 80 executes processing for terminating the inter-controller exclusion processing (S15), responds the processing result to the management server 50, and thereby terminates the processing in this routine.

Next, processing for securing an area for storing the difference bitmap table will be explained with reference to a flowchart in FIG. 15.

Figure 14:
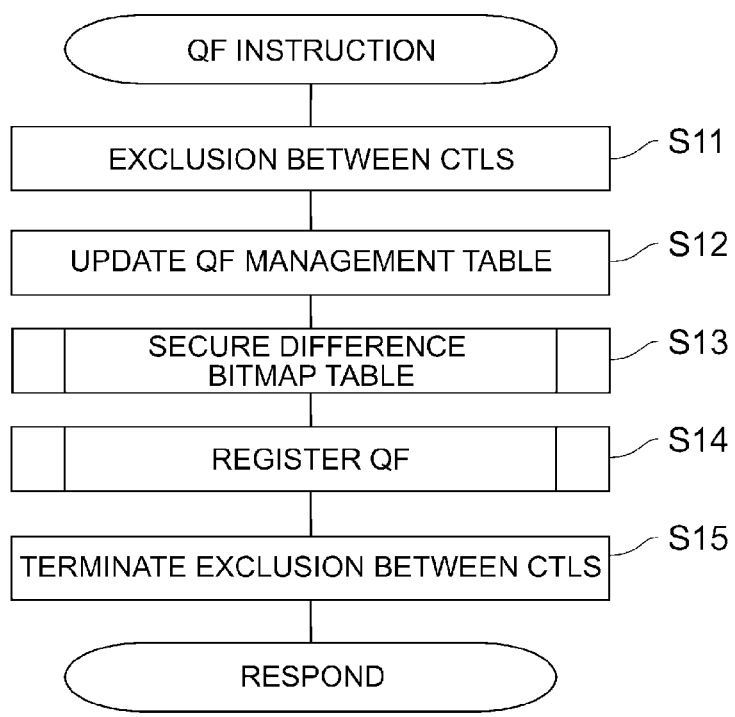
FIG. 14 is a flowchart explaining processing by a controller which has received a quick format instruction.

This processing is processing executed in step S13 in FIG. 14.

The MPU 80 executes processing for allocating a management-information virtual memory (S21), and then terminates the processing in this routine.

Next, the management-information virtual memory allocation processing will be explained with reference to a flowchart in FIG. 16.

Figure 15:
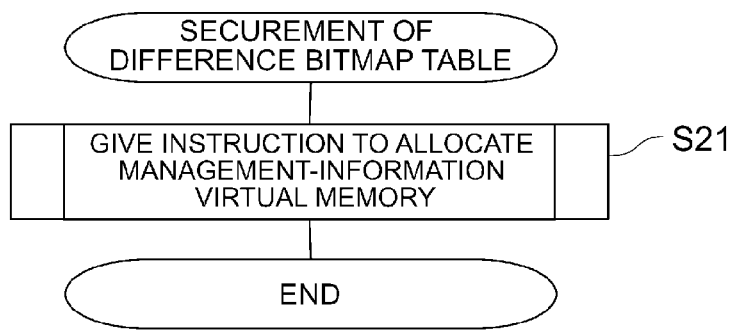
FIG. 15 is a flowchart explaining processing for securing a difference bitmap table.

This processing is processing executed in step S21 in FIG. 15.

The MPU 80 calculates the required capacity from an LU capacity (S31).

For example, if a target LU which is a quick format target is the normal LU 10 and the capacity of the normal LU 10 is 128 TB, the MPU 80 calculates the capacity required to store the difference bitmap table 16 (the required capacity) and, as the result of the calculation, the required capacity is 16 MB.

Next, the MPU 80 calculates the required number of pages from the required capacity (S32). For example, if the required capacity is 16 MB and the page management unit is 1 MB, the MPU 80 calculates "Required Capacity/Page Management Unit=Number of Pages"; and the result of the calculation is "Required Number of Pages=16 Management Information Pages."

Then, the MPU 80 allocates data to the former page area 20 (S33). For example, if the number of pages is 16 management information pages, the MPU 80 executes processing for allocating data of the difference bitmap table 16 corresponding to one management information page to the former page area 20.

Next, the MPU 80 judges whether the required number of pages is two or more pages (S34). If it is determined in step S34 that the required number of pages is one management information page, the MPU 80 responds to the management server 50 that the required number of pages is one management information page, thereby terminating the processing in this routine.

On the other hand, if it is determined in step S34 that the required number of pages is two or more management information pages, the MPU 80 executes processing for allocating data of the difference bitmap table 16 corresponding to the second or subsequent management information pages to the latter page area 22 (S35), responds the processing result to the management server 50, and thereby terminates the processing in this routine.

Figure 17:
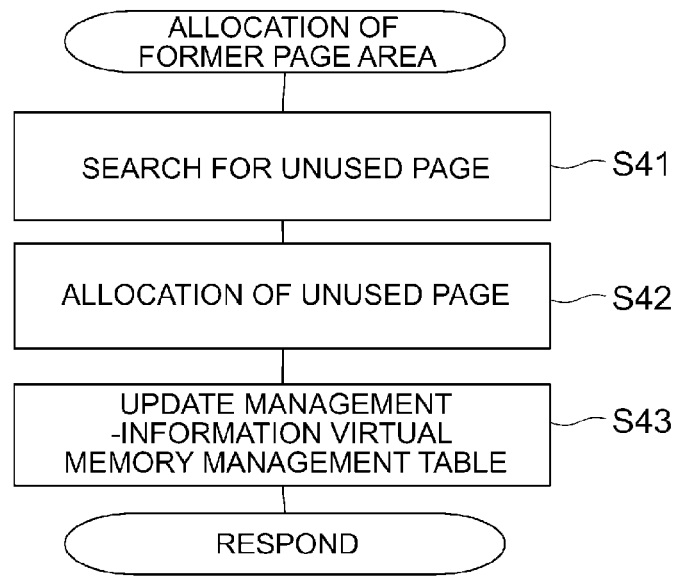
FIG. 17 is a flowchart explaining former page area allocation processing.

Next, the former page area allocation processing will be explained with reference to a flowchart in FIG. 17.

Figure 16:
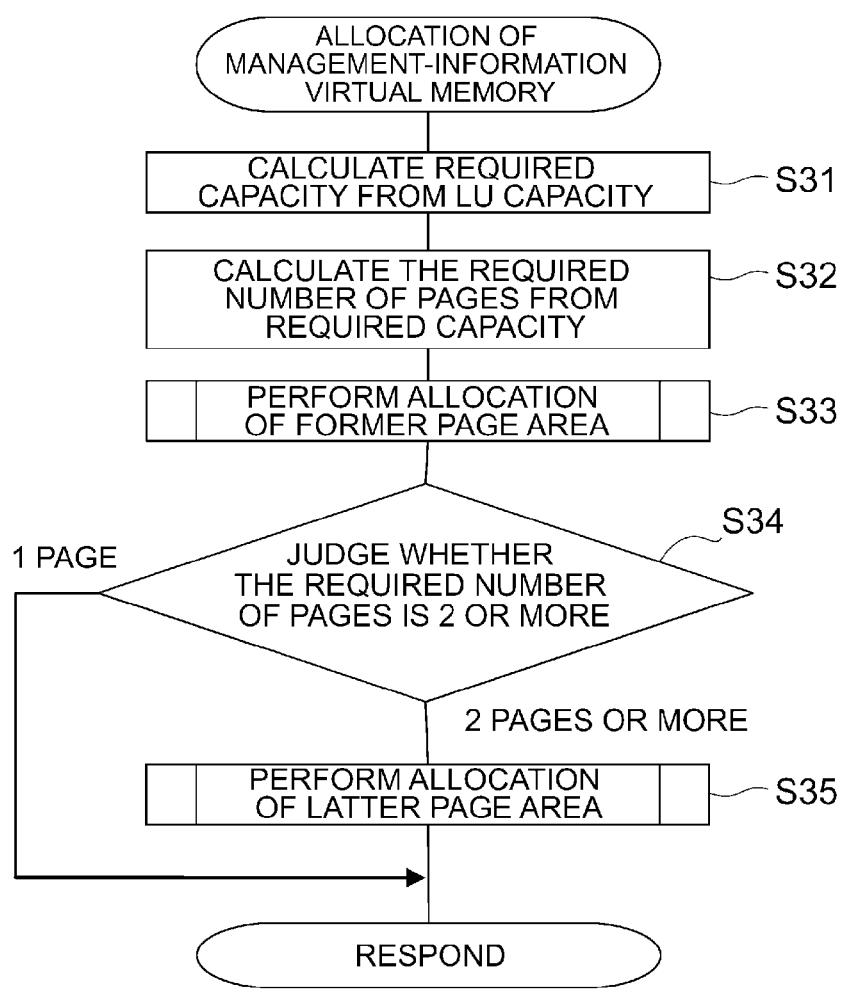
FIG. 16 is a flowchart explaining management-information virtual memory allocation processing.

This processing is processing executed in step S33 in FIG. 16.

The MPU 80 refers to the former page area 20 of the management information LU 18, searches the former page area 20 for an unused management information page (unused area) (S41), and allocates the unused management information page, which was found by the search, as an area for storing the data of the difference bitmap table 16 (S42).

Next, the MPU 80 writes data of one management information page, from among the data of the difference bitmap table 16, to the allocated, unused management information page, registers the address of the management information page, whose data was written, as the former page area address 216 in the management-information virtual memory management table 128 (S43), responds the processing result to the management server 50, and thereby terminates the processing in this routine.

Under this circumstance, the MPU 80 can registers a usage flag indicating that the relevant data and address have already been allocated, to the virtual memory entry 210 of the management-information virtual memory management table 128.

Figure 18:
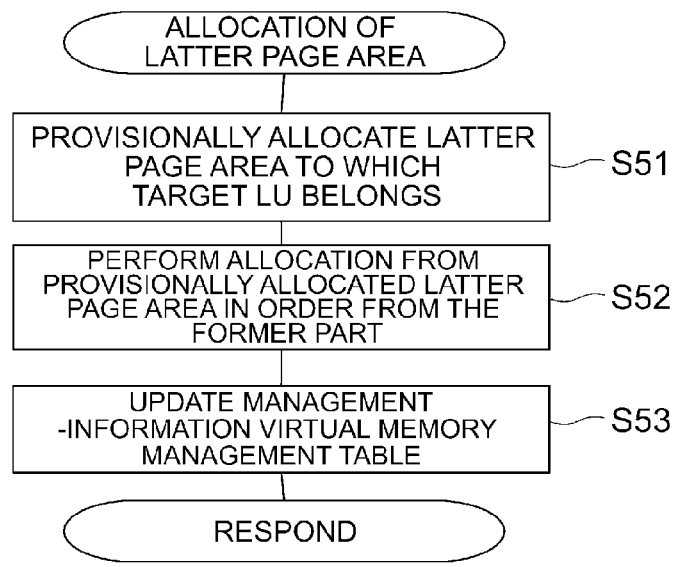
FIG. 18 is a flowchart explaining latter page area allocation processing.

Next, the latter page area allocation processing will be explained with reference to a flowchart in FIG. 18.

This processing is processing executed in step S35 in FIG. 16.

The MPU 80 refers to the locations of LUs in a RAID group and provisionally allocates the latter page area 22 to which a target LU, a quick format target, belongs (S51).

Figure 19:
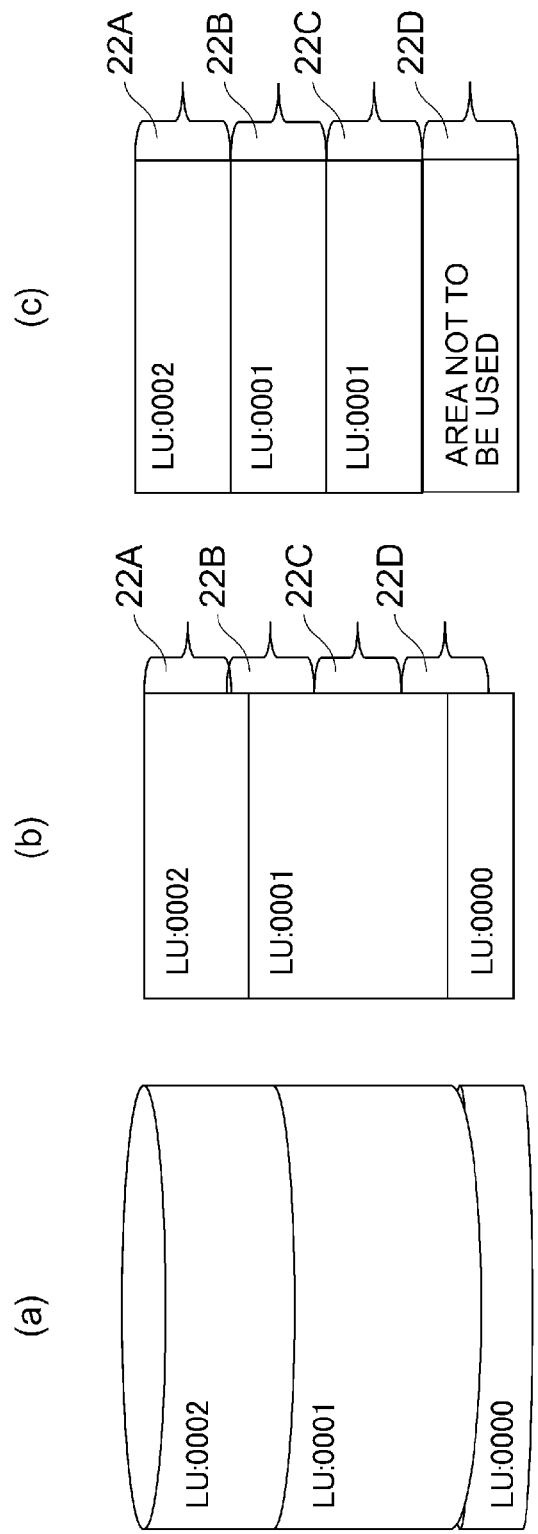
FIG. 19 is a diagram explaining processing for allocating latter page areas to LUs located in a RAID group.

For example, when an LU #0000, an LU #0001, and an LU #0002 are located as LUS in a RAID group as shown in FIG. 19 and the target LU which is the quick format target is the LU #0001, a page 22A and part of page 22B are provisionally allocated to the LU #0002, part of the page 22B, a page 22C, and part of a page 22D are provisionally allocated to the LU #0001, and part of a page 22D is provisionally allocated to the LU #0000 as provisionally allocated pages to the latter page area 22.

Subsequently, the MPU 80 calculates the number of the management information pages 30 required to store the data of the difference bitmap table 16 of each LU on the basis of the capacity of each LU. If the number of pages is, for example, one page for the LU #0000, three pages for the LU #0001, and two pages for the LU #0002, the first page of each LU has already been allocated to the former page area 20, so that, from among the pages of the latter page area 22, zero page is allocated to the LU #0000, two pages are allocated to the LU #0001, and one page is allocated to the LU #0002.

In other words, the MPU 80 allocates each provisionally allocated LU to the latter page area 22 on the basis of the calculated number of pages in such a manner that the provisionally allocated LUs are aligned, without any space between them, in order from the former part (S52).

In this case, as shown in FIG. 19, the MPU 80 allocates the page 22A to the LU #0002 and allocates the page 22B and the page 22C to the LU #0001 as the management information pages 30 allocated to the latter page area 22. Incidentally, the page 22D is set to be an area not to be used.

Subsequently, the MPU 80 registers the addresses of the pages 22A, 22B, 22C allocated, as the management information pages 30 of each LU, to the latter page area 22 as latter page area addresses 218 as well as the page length 220 of each page 22A, 22B, 22C in the management-information virtual memory management table 128 (S53), responds the processing result to the management server 50, and thereby terminates the processing in this routine.

Next, specific processing content of the quick format registration will be explained with reference to a flowchart in FIG. 20.

This processing is processing executed in step S14 in FIG. 14.

Firstly, the MPU 80 executes polling between the controller 70 and the controller 72 and executes exclusion processing for performing quick format registration in one controller of the controllers 70, 72 (S61).

Now, if the quick format registration is performed in the controller 70, the MPU 80 judges whether an LU registered with a quick format (QF), that is, a target LU of the quick format processing exists or not (S62).

If it is determined in step S62 that the target LU of the quick format processing does not exist, the MPU 80 proceeds to processing in step S65. On the other hand, if it is determined in step S62 that the target LU of the quick format processing exists, the MPU 80 refers to the LU management table 124 and judges whether the controller in charge of the quick format processing is the controller 70 or not (S63).

If it is determined in step S63 that the other controller, that is, the controller 72 is the controller in charge of the quick format processing, the MPU 80 proceeds to processing in step S65; and if it is determined in step S63 that the controller 70 is the controller in charge of the quick format processing, the MPU 80 executes processing for activating a quick format job (S64).

Incidentally, if the MPU 80 is composed of multiple cores, one of the multiple cores executes the processing in step S61 to step S63; and in step S63, the core which has executed step S61 to step S63 judges whether the core in charge of the quick format processing is another core or itself (the core which has executed processing in step S61 to step S63).

Subsequently, the MPU 80 completes the inter-controller exclusion processing (S65) and thereby terminates the processing in this routine.

Next, the job activation processing will be explained with reference to a flowchart in FIG. 21.

Figure 20:
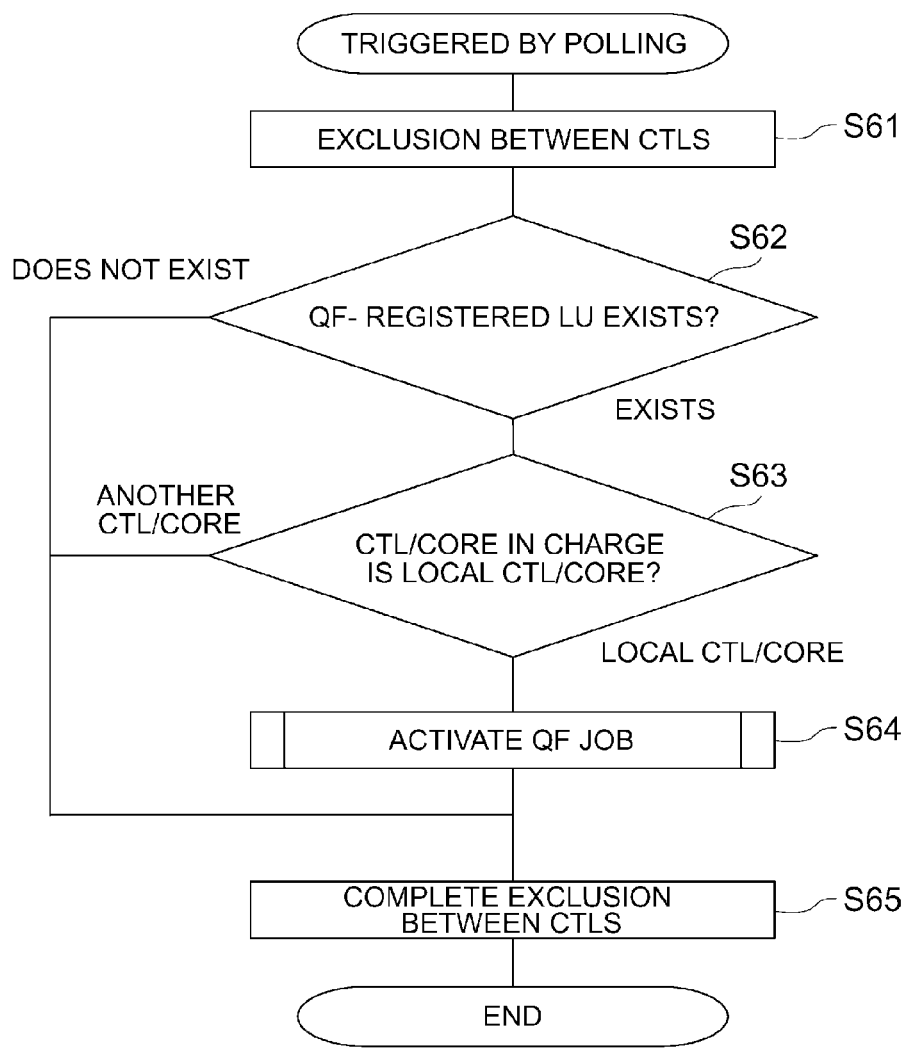
FIG. 20 is a flowchart explaining QF registration processing executed as triggered by polling.

This processing is processing executed in step S64 in FIG. 20.

The MPU 80 executes initialization processing for initializing, for example, variables stored in the local memory 84 (S71) and then executes extent lock securement processing (S72).

For example, the MPU 80 executes exclusion processing for executing only the quick format processing as a job.

Next, the MPU 80 executes format processing on one quick format target area (S73).

For example, if the normal LU 10 is a target of the quick format processing, the MPU 80 executes processing for changing registered data of one quick format target area 14 from "1" to "0" as the format processing on the one quick format target area 14.

Next, the MPU 80 judges whether the format processing on the one quick format target area has been completed or not (S74). If it is determined in step S74 that the format processing on the one quick format target area has not been completed, the MPU 80 returns to the processing in step S73; and if it is determined that the format processing on the one quick format target area has been completed, the MPU 80 executes difference bitmap update processing (S75).

Under this circumstance, the MPU 80 also executes write processing on the management-information virtual memory during the process of the difference bitmap update processing.

Next, the MPU 80 executes processing for releasing an extent lock (S76) and executes processing for next format area search processing (S77). If it is determined in step S77 that the next format area exists, the MPU 80 executes processing for setting the next format area (S78), then returns to the processing in step S72, and repeats the processing from step S72 to S77.

On the other hand, if it is determined in step S77 that the format processing on all areas has been completed, the MPU 80 completes the format processing on the normal LU 10 (S79) and thereby terminates the processing in this routine.

Next, the content of the difference bitmap update processing will be explained with reference to a flowchart in FIG. 22.

Figure 21:
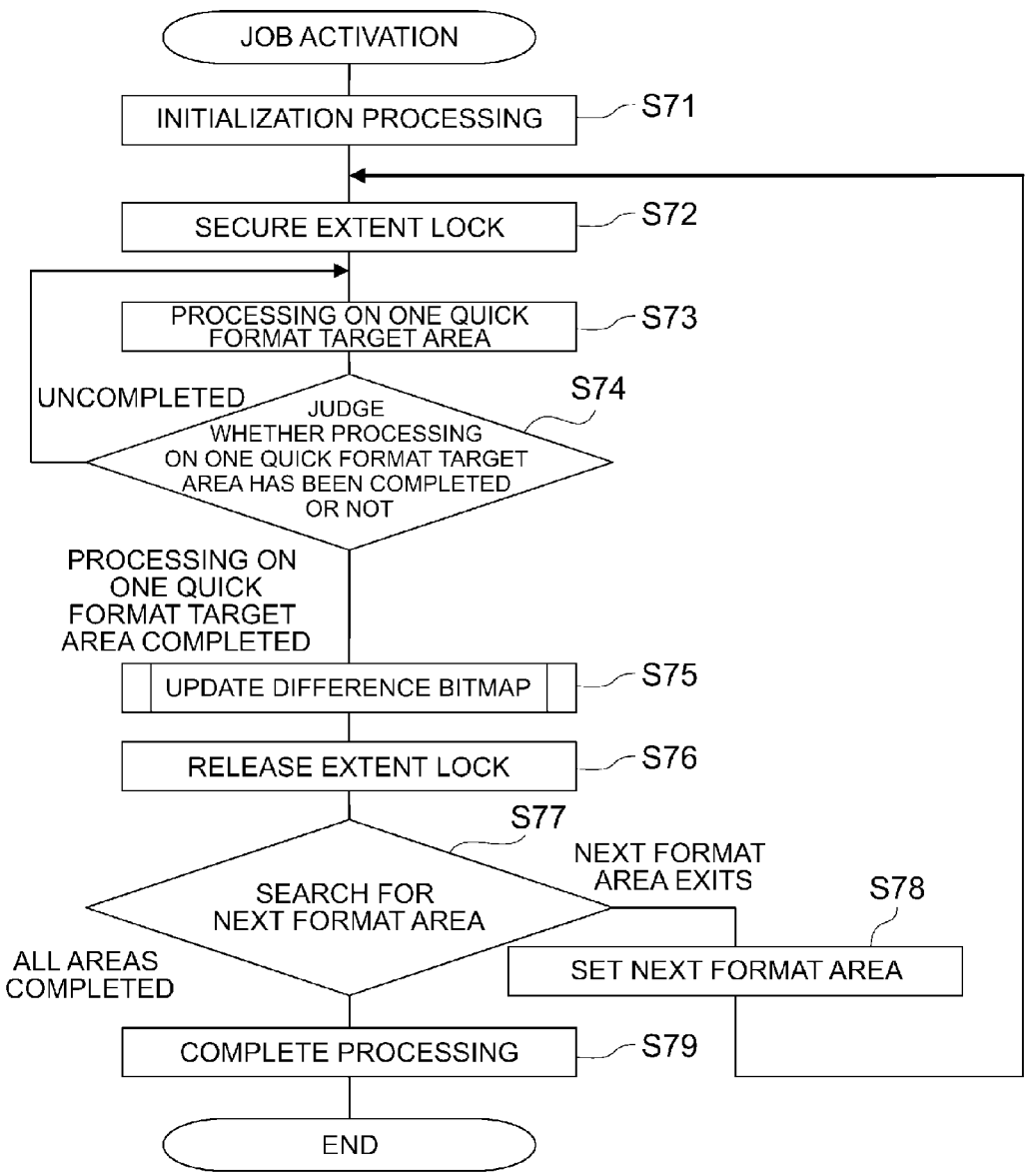
FIG. 21 is a flowchart explaining job activation processing.

This processing is processing executed in step S75 in FIG. 21.

The MPU 80 gives instruction to update the management-information virtual memory; and, for example, if the quick format processing on the quick format target area 14 of the normal LU 10 has been completed, the MPU 80 executes processing for changing the difference bit of the difference bitmap table 16 corresponding to this quick format target area 14 from "1" to "0" (S81) and thereby terminates the processing in this routine.

Next, the next format area search processing will be explained with reference to a flowchart in FIG. 23.

This processing is processing executed in step S77 in FIG. 21.

The MPU 80 refers to the difference bitmap table 16 as processing of management-information virtual memory reference instruction and executes processing for judging the difference bit (S91).

Next, the MPU 80 judges whether the next format area has been formatted or not (S92).

If the MPU 80 refers to the difference bitmap table 16 under the above-described circumstance and determines that the next format area has been formatted, it returns to the processing in step S91; and if the MPU 80 determines that the next format area has not been formatted, or if the MPU 80 determines that all format areas have been formatted, it terminates the processing in this routine.

Next, the management-information virtual memory access processing will be explained with reference to a flowchart in FIG. 24.

Figure 22:
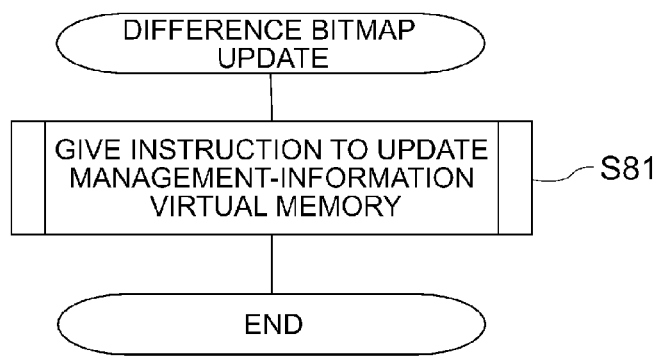
FIG. 22 is a flowchart explaining difference bitmap update processing.
Figure 23:
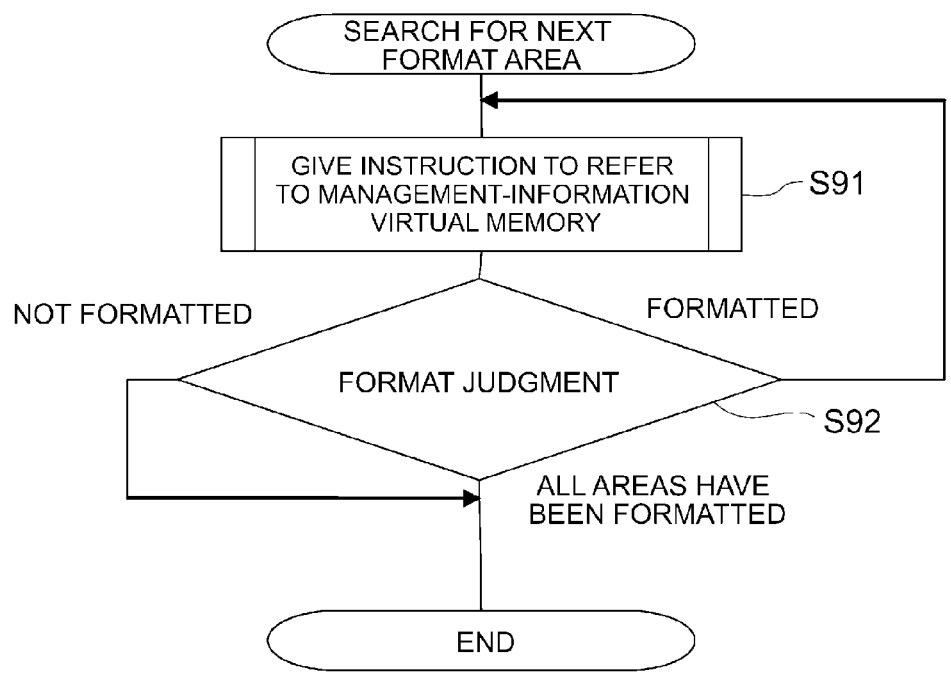
FIG. 23 is a flowchart explaining next format area search processing.

This processing is processing executed in step S81 in FIG. 22 or step S91 in FIG. 23.

The MPU 80 identifies the difference bitmap table 16 based on a face number (number for identifying an LU, which is a quick format target, and for identifying the virtual memory entry 210) and executes processing for calculating a physical address from a virtual memory address (S102).

Next, the MPU 80 refers to the cache memory 86 based on the calculated physical address and judges whether data registered in the difference bitmap table 16 exists in the cache memory 86 or not (S103).

If the MPU 80 determines in step S103 that the data registered in the difference bitmap table 16 exists in the cache memory 86, it proceeds to processing in step S105; and if the MPU 80 determines in step S103 that the data registered in the difference bitmap table 16 does not exist in the cache memory 86, it reads the data registered in the difference bitmap table 16 from the storage device 76 to the cache memory 86 (S104).

Subsequently, the MPU 80 executes processing for referring to, or updating, the data registered in the difference bitmap table 16 in the cache memory 86 (S105), responds the processing result to the management server 50, and thereby terminates the processing in this routine.

Figure 25:
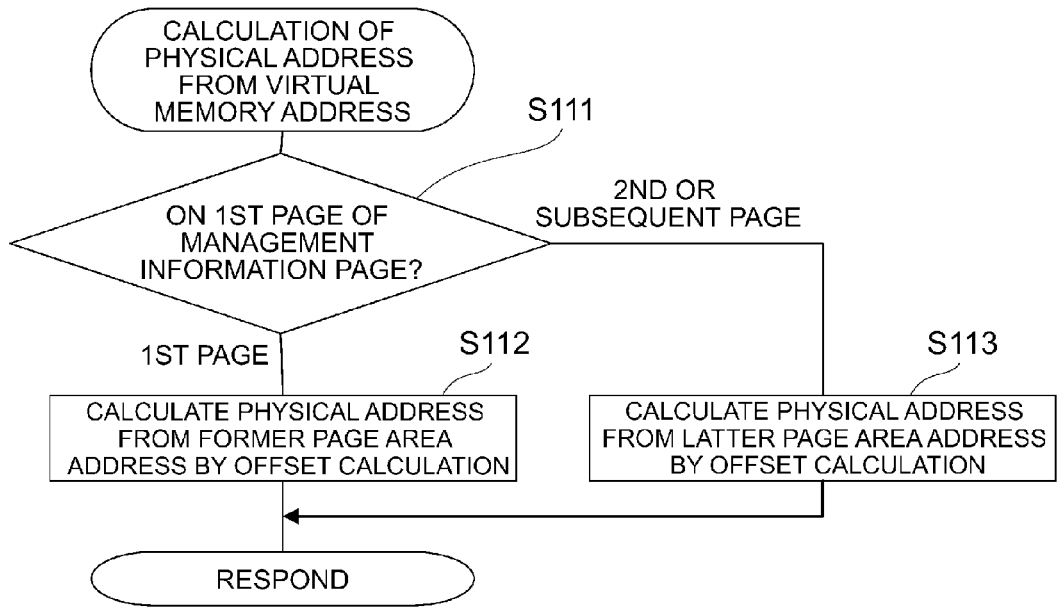
FIG. 25 is a flowchart explaining processing for calculating a physical address from a virtual memory address.

Next, the processing for calculating the physical address from the virtual memory address will be explained with reference to a flowchart in FIG. 25.

Figure 24:
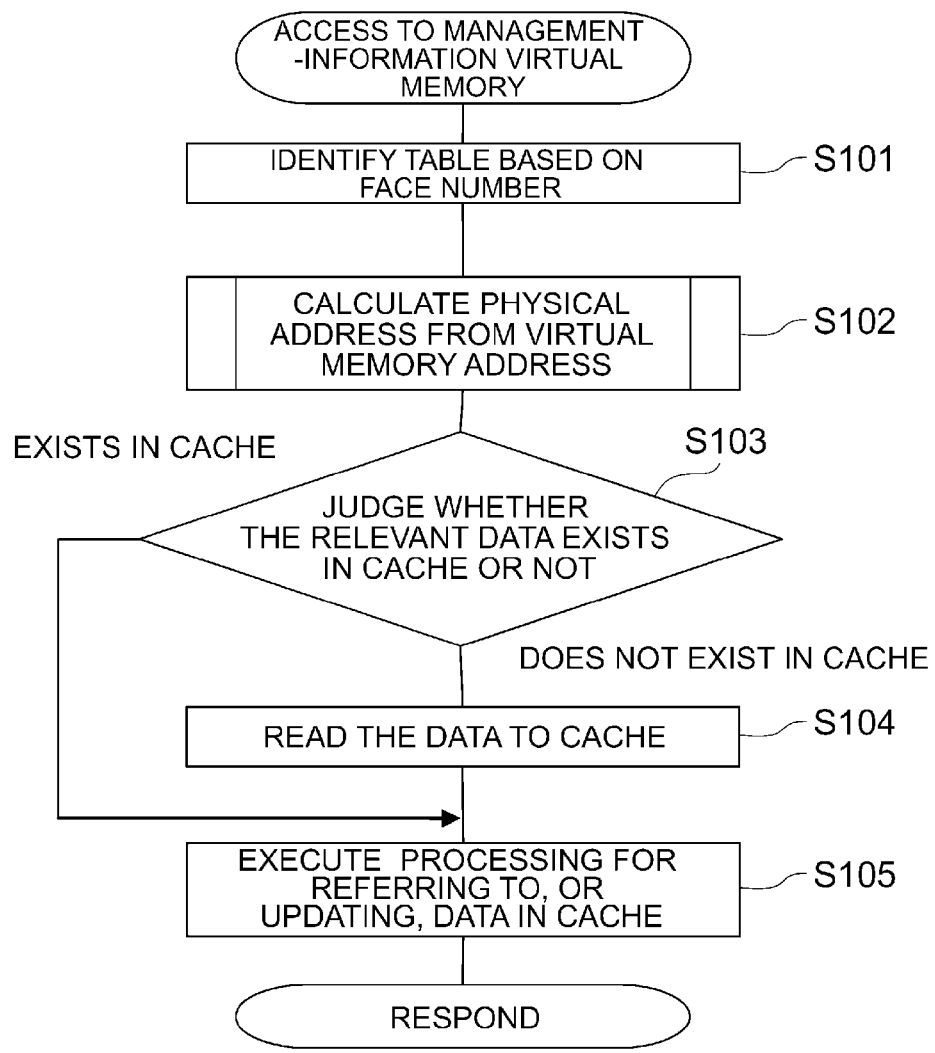
FIG. 24 is a flowchart explaining management-information virtual memory access processing.

This processing is processing executed in step S102 in FIG. 24.

The MPU 80 performs calculation by dividing the management-information virtual memory address by the page management unit (1 MB) in order to judge what management information page number of information is requested, based on the management-information virtual memory address obtained by a command; and then judges whether information of the first management information page is requested or not, based on the number of the management information pages 30 obtained by the above calculation (S111).

If it is determined in step S111 that the management information page 30 is on the first page, the MPU 80 calculates the physical address of the management information page 30 by offset calculation based on the former page area address 216 (S112).

On the other hand, if it is determined in step S111 that the management information page 30 is on the second or subsequent page, the MPU 80 calculates the physical address of the management information page 30 on the second or subsequent page by offset calculation based on the latter page area address 218 (S113).

After the processing in step S112 or step S113, the MPU 80 responds each processing result to the management server 50 and thereby terminates the processing in this routine.

Next, processing for determining ownership of the management information page will be explained.

Generally, the ownership to access the management information page 30 belongs to a controller for managing an LU to which the management information page 30 is allocated, or a core belonging to such a controller. Accordingly, the core or controller for accessing the management information page 30 is limited to the core or controller for accessing the management information page 30, so that the ownership of the management information page 30 is not judged during the general processing for accessing the management-information virtual memory.

On the other hand, if processing for restoring the storage device 76 is executed, the ownership of the management information page 30 is judged. There are two methods for the processing for determining the ownership of the management information page 30 as described below.

Figure 26:
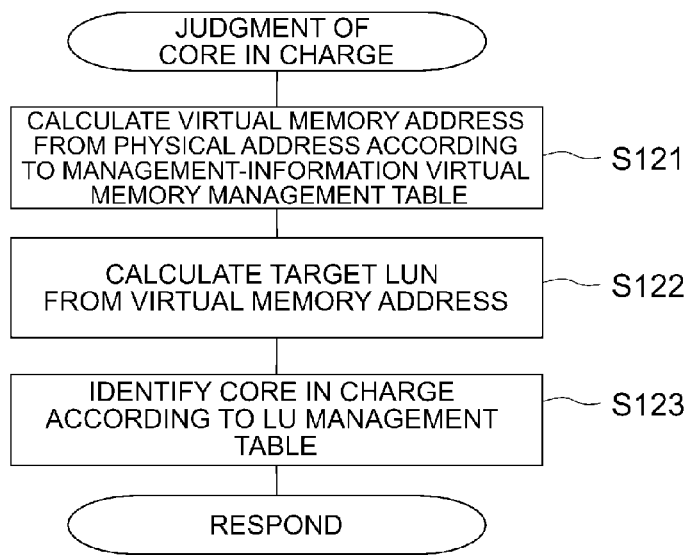
FIG. 26 is a flowchart explaining first core-in-charge judgment processing.

Next, first core-in-charge judgment processing for determining ownership of the management information page will be explained with reference to a flowchart in FIG. 26.

For example, the MPU 80 for the controller 70 refers to the management-information virtual memory management table 128 based on restoration instruction from the management server 50, calculates a virtual memory address from a physical address allocated to the management information page 30, which is a restoration target (S121), and calculates a target LU 212, which is a restoration target, based on the calculated virtual memory address (S122).

Next, the MPU 80 refers to the LU management table 124 based on the calculated target LU 212, identifies the core in charge based on the ownership 192 of the LU management table 124 (S123), responds the processing result to the management server 50, and thereby terminates the processing in this routine.

Figure 27:
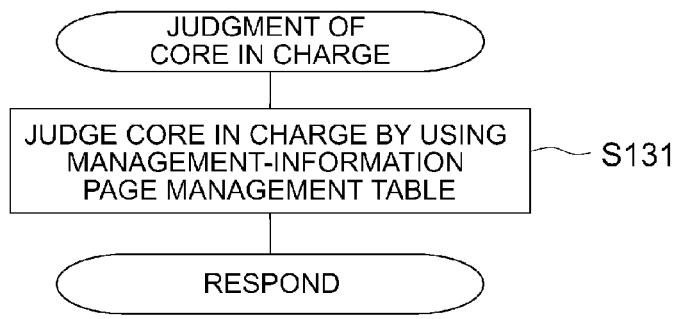
FIG. 27 is a flowchart explaining second core-in-charge judgment processing.

Next, second core-in-charge judgment processing for determining the ownership of the management information page will be explained with reference to a flowchart in FIG. 27.

Firstly, when the controller 70 receives instruction from the management server 50 to execute restoration processing, the MPU 80 for the controller 70 refers to the management-information page management table 130 in order to search for an LU which is a restoration target; and if the LU which is the restoration target exists as the storage location LU 232, the MPU 80 determines the core in charge based on the ownership 238 registered in the LU 4096 address 230 (S131), responds the processing result to the management server 50, and thereby terminates the processing in this routine.

In this case, since the core in charge can be directly identified simply by referring to the management-information page management table 130, processing time to determine the ownership of the management information page is shorter than that of the first core-in-charge judgment processing.

Next, read processing on a normal LU will be explained with reference to a flowchart in FIG. 28.

When the controller 70 receives a read command from the host 56, the MPU 80 for the controller 70 refers to the ownership 192 of the LU management table 124 based on the read command and judges whether that controller is a controller which should take charge of processing of the read command (S141), If it is determined in step S141 that the controller is the controller which should take charge of the processing of the read command, the MPU 80 executes the normal read processing (S141) and thereby terminates the processing in this routine.

On the other hand, if it is determined in step S141 that the controller which should take charge of the processing of the read command is another controller, the MPU 80 executes cross call read processing for transferring the read command to the controller 72 via the data transfer control circuit 90 (S143) and then terminates the processing in this routine.

Figure 29:
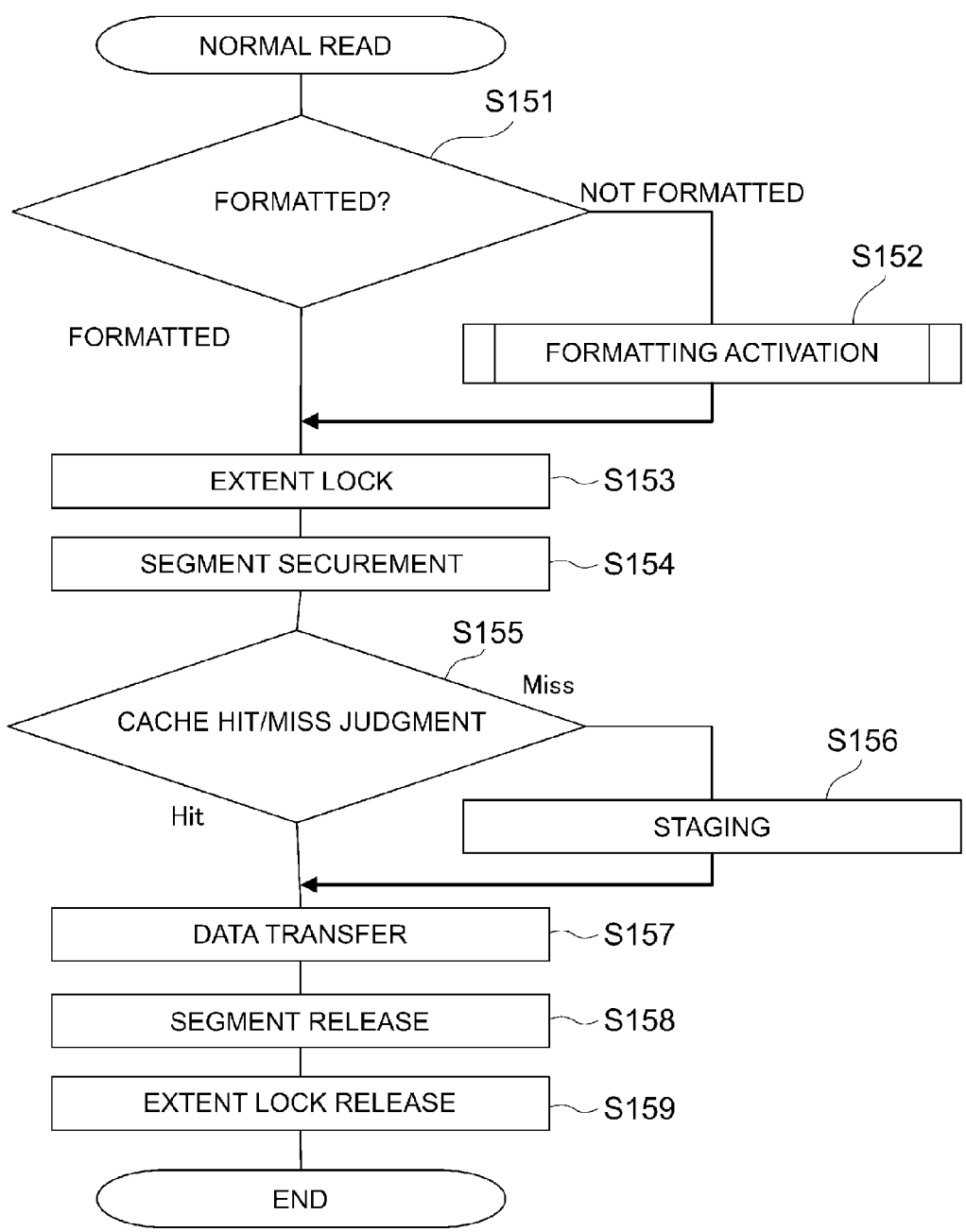
FIG. 29 is a flowchart explaining normal read processing.

Next, normal read processing will be explained with reference to a flowchart in FIG. 29.

Figure 28:
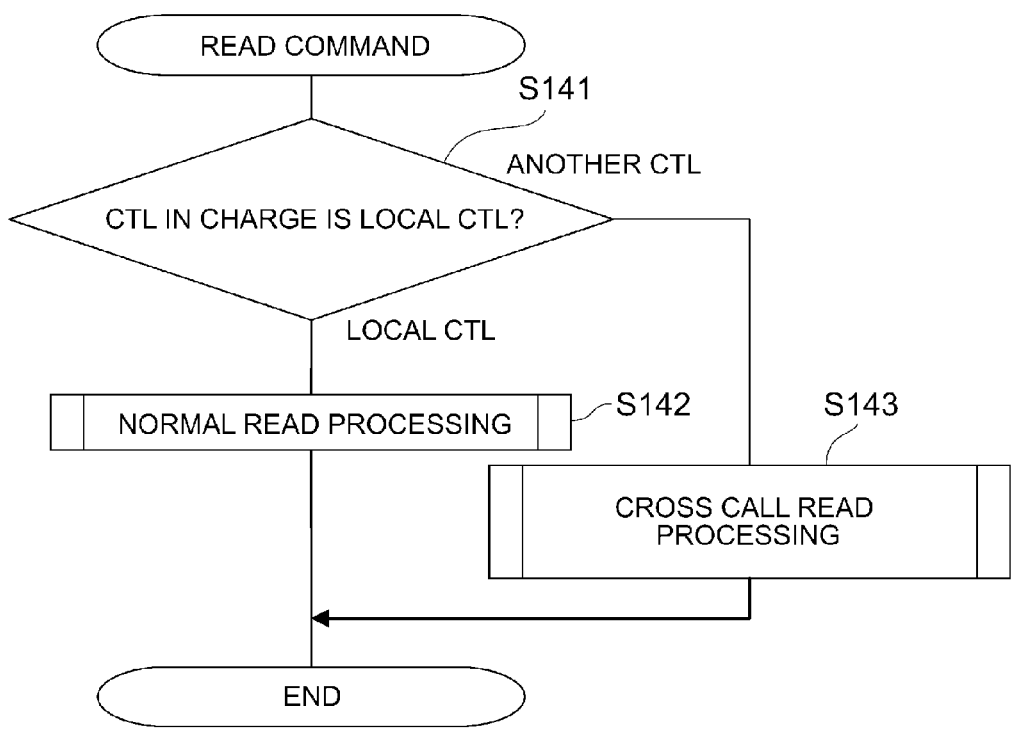
FIG. 28 is a flowchart explaining read command processing.

This processing is processing executed in step S142 in FIG. 28.

Firstly, the MPU 80 judges whether an LU at a data read location designated by the read command, from among a plurality of LUs existing in the normal LU 10, has been formatted or not (S151).

Under this circumstance, the MPU 80 refers to the difference bitmap table 16 corresponding to the LU at the data read location and judges whether the quick format target area 14 at the data read location has been formatted or not. If the quick format target area 14 at the data read location has not been formatted, the MPU 80 starts formatting activation processing (S152) and proceeds to processing in step S153; and if it is determined in step S151 that the quick format target area 14 at the data read location has been formatted, the MPU 80 proceeds to processing in step S153.

In step S153, the MPU 80 executes the extent lock as exclusion processing for executing the read processing on only the LU at the data read location. Subsequently, the MPU 80 executes segment securement processing for securing a readout area in the cache memory 86 (S154).

Next, the MPU 80 judges whether a cache hit or a cache miss (S155).

Specifically speaking, the MPU 80 judges whether read data exists in the cache memory 86 or not. If it is determined that this is a cache miss, the MPU 80 executes staging processing for reading the read data from the storage device 76 to the cache memory 86 (S156) and proceeds to processing in step S157.

On the other hand, if it is determined in step S155 that this is a cache hit, the MPU 80 executes data transfer processing for transferring the read data existing in the cache memory 86 or the read data staged from the storage device to the host 56 (S157).

Subsequently, the MPU 80 executes segment release processing (S158), then executes extent lock release processing (S159), and thereby terminates the processing in this routine.

Figure 30:
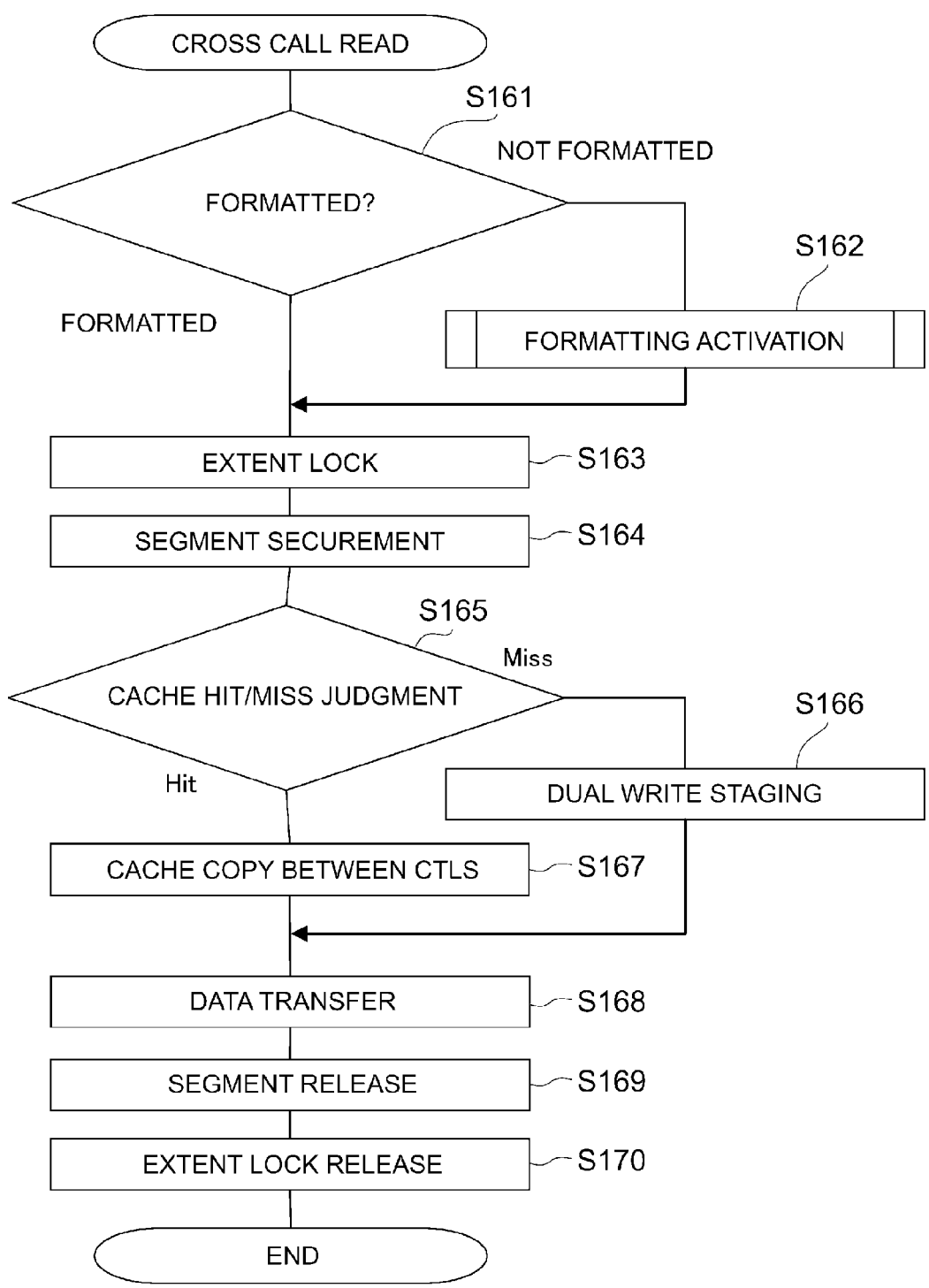
FIG. 30 is a flowchart explaining cross call read processing.

Next, the cross call read processing will be explained with reference to a flowchart in FIG. 30.

This processing is processing executed in step S143 in FIG. 28.

When the MPU 100 for the controller 72 receives a read command transferred from the controller 70, it judges whether the LU at the data read location has been formatted or not, based on the received read command (S161).

Under this circumstance, the MPU 100 refers to the difference bitmap table 16 corresponding to the LU at the data read location and judges whether the quick format target area 14 at the data read location has been formatted or not. If the quick format target area 14 at the data read location has not been formatted, the MPU 100 starts formatting activation processing (S162) and proceeds to processing in step S163; and if it is determined in step S161 that the quick format target area 14 at the data read location has been formatted, the MPU 80 proceeds to processing in step S163.

In step S163, the MPU 100 executes the extent lock as exclusion processing for executing the read processing on only the LU at the data read location. Subsequently, the MPU 80 executes segment securement processing for securing a readout area in the cache memory 106 (S154).

Next, the MPU 100 judges whether a cache hit or a cache miss (S165).

Specifically speaking, the MPU 100 judges whether read data exists in the cache memory 106 or not. If it is determined that this is a cache miss, the MPU 100 executes double write staging processing for reading the read data from the storage device 76 to the cache memory 106 and the cache memory 86 respectively (S166) and proceeds to processing in step S168.

On the other hand, if it is determined in step S165 that this is a cache hit, the MPU 100 executes inter-controller cache copy processing for copying the read data existing in the cache memory 106 to the cache memory 84 for the controller 70 and then proceeds to processing in step S168.

Subsequently, the MPU 100 executes data transfer processing for transferring the read data existing in the cache memory 106 or the read data staged from the storage device 76 to the host 56 (S168).

Next, the MPU 100 executes segment release processing (S169), then executes extent lock release processing (S170), and thereby terminates the processing in this routine.

Judgment of whether formatting has been performed or not is executed by the controller in charge of the processing of the LU which is the quick format target as described above. The processing for referring to the information of the difference bitmap table 16 is also executed by the controller in charge of the quick format processing. Therefore, during the normal quick format processing or the read access from the host 56, it is unnecessary to judge the controller or core in charge of the management information page 30 and access between the controllers or the cores will be excluded.

The case where the controller 70 receives a read command from the host 56 has been described; however, also in a case where the controller 70 or the controller 72 receives a write command from the host 56, processing for writing write data to an LU at a data write location can be executed by executing normal write processing instead of the normal read processing and executing cross call write processing instead of the cross call read processing.

When receiving a read command or a write command from the host 56, which is an access requestor, under the above-described circumstance, the controller 70 calculates a virtual memory address, which indicates an address in the difference bitmap table (format management information) 16, based on the read command or the write command; the controller 70 calculates the number of the management information pages 30 corresponding to an access location according to a ratio of the calculated virtual memory address to the page management unit (1 MB); and if one management information page 30 exists as the calculated number of pages, the controller 70 calculates a physical address of the access location from a former page area address corresponding to the one management information page 30; and on condition that information indicating that formatting has been performed is registered in the difference bitmap table 16 stored in the former page area 20 identified with the former page area address corresponding to the one management information page 3, the controller 70 executes read access or write access to the access location at the calculated physical address.

Furthermore, when the controller 70 calculates the number of the management information pages 30 corresponding to the access location, if two or more management information pages 30 exist as the calculated number of pages, the controller 70 calculates the physical address of the access location from the latter page area addresses and page length corresponding to the two or more management information pages 30; and on condition that information indicating that formatting has been performed is registered in the difference bitmap table 16 stored in the latter page area 22 identified with the latter page area addresses and page length corresponding to the two or more management information pages 30, the controller 70 executes read access or write access to the access location at the calculated physical address.

Furthermore, the job activation processing in FIG. 21 is executed when activating the format processing in step S152 and for the formatting activation processing in step S162.

According to this embodiment, the size of the management information pages 30 for storing the difference bitmap table (format management information) 16 can be minimized and the management size of the management information page 30 can be reduced.

According to this embodiment, the format management information (difference bitmap table 16) for managing the management information LU 18 can be managed, regardless of the page management unit, by using information of the former page area address 216, the latter page area addresses 218, and the page length 220 of the management information page 30 allocated to the latter page areas 22. Therefore, the format management information can be managed in the stripe string size unit which is a minimum RAID group access unit and useless areas occurring due to exclusive control can be minimized.

Furthermore, the format management information for managing the management information LU 18 is a constant value regardless of the size of the format target LU, so that the format management information can be applied to further capacity expansion of the disk array apparatus.

Second Embodiment

FIG. 31 shows a configuration diagram of a second embodiment of the present invention in a case where a storage location of the difference bitmap table 16 is a thin provisioning pool.

If a thin provisioning pool 500 is formed in logical storage areas of a plurality of storage devices 76 in FIG. 31, a plurality of chunks 502 can be formed in the thin provisioning pool 500 and a virtual volume 504 can be formed in any chunks 502.

At an initial stage when the virtual volume 504 is not accessed by the host 56, the virtual volume 504 is in a state where no logical volume or page is allocated to its virtual storage area. On the other hand, when the host 56 inputs an access request, for example, write access, to the virtual volume 504, a virtual storage area of each virtual volume 504 is divided into a plurality of blocks by means of a capacity virtualization control function (processing function implemented by activation of a capacity virtualization control program) at the timing of the write access and logical volumes registered in the thin provisioning pool 500 are allocated to each block.

If the virtual volume 504 is allocated to any chunk 502 under this circumstance, pages 506 of the virtual volume 504 are composed of, for example, 32 MB, so that an unused area 508 is formed in the chunks 502 and areas of the chunks 502 cannot be utilized effectively.

On the other hand, if the thin provisioning pool 500 is divided in a stripe string size unit into a plurality of chunks 502 by using pages 510 to be allocated to the chunks 502, regarding which a management information page size is set to be equal to the stripe string size, a plurality of pages 510 can be allocated in each chunk 502 without forming an unused area. As a result, the thin provisioning pool 500 can be shared with virtual LUs of users. Incidentally, for example, 1 GB can be used as the capacity of the chunks 502.

According to this embodiment, the plurality of pages 510 can be allocated in each chunk 502 without forming an unused area by dividing the thin provisioning pool 500 in the stripe string size unit into a plurality of chunks 502.

Incidentally, the management information LU 18 which is the storage location of the difference bitmap table 16 can be formed into SSDs constituting a RAID. In this case, an access speed can be increased more than a case when the management information LU 18 is formed into HDDs.

Furthermore, the present invention is not limited to the aforementioned embodiments, and includes various variations. For example, the aforementioned embodiments have been described in detail in order to explain the invention in an easily comprehensible manner and are not necessarily limited to those having all the configurations explained above. Furthermore, part of the configuration of a certain embodiment can be replaced with the configuration of another embodiment and the configuration of another embodiment can be added to the configuration of a certain embodiment. Also, part of the configuration of each embodiment can be deleted, or added to, or replaced with, the configuration of another configuration.

Furthermore, part or all of the aforementioned configurations, functions, and so on may be realized by hardware by, for example, designing them in integrated circuits. Also, each of the aforementioned configurations, functions, and so on may be realized by software by processors interpreting and executing programs for realizing each of the functions. Information such as programs, tables, and files for realizing each of the functions may be recorded and retained in memories, storage devices such as hard disks and SSDs (Solid State Drives), or storage media such as IC (Integrated Circuit) cards, SD (Secure Digital) memory cards, and DVDs (Digital Versatile Discs).

REFERENCE SIGNS LIST

10 Normal LU
14 Quick format target area
16 Difference bitmap table
18 Management information LU
20 Former page area
22 Latter page area
24 Stripe string
30 Management unit
50 Management server
52 Disk array apparatus
54 Network
56 Host
58 Storage control device
60 Additional chassis
70, 72 Controllers
74 Basic chassis
76 Storage device
80, 100 MPUs
84, 104 Local memories
86, 106 Cache memories
88, 108 Host interfaces
90, 110 Data transfer control circuits
92, 112 Disk interfaces
120 Drive management table
122 RG management table
124 LU management table
126 QF management table
128 Management-information virtual memory management table
130 Management-information page management table

The invention claimed is:

1. A storage system comprising:
a plurality of storage devices configuring a RAID group;
a plurality of access-target logical units, each of which is a logical unit formed in a storage area of the plurality of storage devices and is an access target of an access requestor;
a management-information logical unit that is a logical unit formed in the storage area of the plurality of storage devices and whose area for storing format management information for managing whether each of the access-target logical units has been formatted or not is divided into a former page area and a latter page area; and one or more controllers for controlling data input to, or output from, each logical unit and executing format processing on the access-target logical units;

wherein when executing the format processing on the access-target logical units, the controller: calculates a capacity of the format management information based on a capacity of each of the access-target logical units; calculates, according to a ratio of the calculated capacity of the format management information to a page management unit with a specified capacity, the number of management information pages necessary to manage the format management information using the page management unit; allocates part of the format management information for the plurality of access-target logical units, from among the format management information corresponding to the calculated number of the management information pages, to the former page area; allocates the remaining format management information for the plurality of access-target logical units, from among the format management information corresponding to the calculated number of the management information pages, to the latter page area by considering allocation of the plurality of access-target logical units in the RAID group; and stores an execution result of the format processing as the format management information in the former page area or the latter page area.

2. The storage system according to claim 1, wherein if one management information page exists as the calculated number of pages, the controller allocates a storage location of the format management information corresponding to the one management information page to the former page area and manages the storage location of the format management information corresponding to the one management information page by using a former page area address; and if two or more management information pages exist as the calculated number of pages, the controller allocates storage locations of the format management information corresponding to the two or more management information pages to the latter page area and manages the storage locations of the format management information corresponding to the two or more management information pages by using latter page area addresses and a page length of the two or more management information pages.

3. The storage system according to claim 1, wherein the management information page allocated to the former page area or the latter page area is a minimum unit of read access or write access by the controller and is configured with a capacity equal to an integral multiple of a stripe string formed in a logical storage area of the storage devices.

4. The storage system according to claim 1, wherein the management information page stores ownership information indicating exclusive ownership of access to the management information page in association with any of the controllers.

5. The storage system according to claim 1, wherein when receiving a read command or write command from the access requestor, the controller identifies an access location based on the read command or the write command, refers to the format management information corresponding to the access location from among the format management information stored in the management-information logical unit, and executes read access or write access to the access location on condition that information indicating that formatting has been performed, is registered in the format management information corresponding to the access location.

6. The storage system according to claim 2, wherein when receiving a read command or write command from the access requestor, the controller calculates a virtual memory address indicating an address in the format management information on the basis of the read command or the write command; the controller calculates the number of management information pages corresponding to an access location according to a ratio of the calculated virtual memory address to the page management unit; and if one management information page exists as the calculated number of pages, the controller calculates a physical address of the access location from the former page area address corresponding to the one management information page, and executes read access or write access to the access location of the calculated physical address on condition that information indicating that formatting has been performed is registered in the format management information stored in the former page area identified with the former page area address corresponding to the one management information page; and if two or more management information pages exist as the calculated number of pages, the controller calculates the physical address of the access location from the latter page area addresses and the page length corresponding to the two or more management information pages, and executes read access or write access to the access location of the calculated physical address on condition that information indicating that formatting has been performed is registered in the format management information stored in the latter page area identified with the latter page area addresses and the page length corresponding to the two or more management information pages.

7. A logical unit management method for a storage system including:

a plurality of storage devices configuring a RAID croup;

a plurality of access-target logical units, each of which is a logical unit formed in a storage area of the plurality of storage devices and is an access target of an access requestor;

a management-information logical unit that is a logical unit formed in the storage area of the plurality of storage devices and whose area for storing format management information for managing whether each of the access-target logical units has been formatted or not is divided into a former page area and a latter page area; and one or more controllers for controlling data input to, or output from, each logical unit and executing format processing on the access-target logical unit;

the logical unit management method comprising, as steps executed by the controller when executing the format processing on the access-target logical unit:

a step executed by the controller calculating a capacity of the format management information based on a capacity of each of the access-target logical units;

a step executed by the controller calculating, according to a ratio of the calculated capacity of the format management information to a page management unit with a specified capacity, the number of management information pages necessary to manage the format management information using the page management unit;

a step executed by the controller allocating part of the format management information for the plurality of access-target logical units, from among the format management information corresponding to the calculated number of the management information pages, to the former page area;

a step executed by the controller allocating the remaining format management information for the plraulty of access target logical units, from among the format management information corresponding to the calculated number of the management information pages, to the latter page area by consierinq allocation of the plurality of access-target logical units in the RAID group; and a step executed by the controller storing an execution result of the format processing as the format management information in the former page area or the latter page area.

8. The logical unit management method for the storage system according to claim 7, wherein if one management information page exists as the calculated number of pages, the controller allocates a storage location of the format management information corresponding to the one management information page to the former page area and manages the storage location of the format management information corresponding to the one management information page by using a former page area address; and if two or more management information pages exist as the calculated number of pages, the controller allocates storage locations of the format management information corresponding to the two or more management information pages to the latter page area and manages the storage locations of the format management information corresponding to the two or more management information pages by using latter page area addresses and a page length of the two or more management information pages.

9. The logical unit management method for the storage system according to claim 7, wherein the management information page allocated to the former page area or the latter page area is a minimum unit of read access or write access by the controller and is configured with a capacity equal to an integral multiple of a stripe string formed in a logical storage area of the storage devices.

10. The logical unit management method for the storage system according to claim 7, wherein the management information page stores ownership information indicating exclusive ownership of access to the management information page in association with any of the controllers.

11. The logical unit management method for the storage system according to claim 7, further comprising as steps executed by the controller when receiving a read command or write command from the access requestor:

a step executed by the controller identifying an access location based on the read command or the write command;

a step executed by the controller referring to the format management information corresponding to the access location from among the format management information stored in the management-information logical unit; and a step executed by the controller executing read access or write access to the access location on condition that information indicating that formatting has been performed is registered in the format management information corresponding to the access location.

12. The logical unit management method for the storage system according to claim 8, further comprising as steps executed by the controller when receiving a read command or write command from the access requestor:

a step executed by the controller calculating a virtual memory address indicating an address in the format management information on the basis of the read command or the write command;

a step executed by the controller calculating the number of management information pages corresponding to an access location according to a ratio of the calculated virtual memory address to the page management unit;

a step executed, if one management information page exists as the calculated number of pages, by the controller calculating a physical address of the access location from the former page area address corresponding to the one management information page;

a step executed by the controller executing read access or write access to the access location of the calculated physical address on condition that information indicating that formatting has been performed is registered in the format management information stored in the former page area identified with the former page area address corresponding to the one management information page;

a step executed, if two or more management information pages exist as the calculated number of pages, by the controller calculating the physical address of the access location from the latter page area addresses and the page length corresponding to the two or more management information pages; and a step executed by the controller executing read access or write access to the access location of the calculated physical address on condition that information indicating that formatting has been performed is registered in the format management information stored in the latter page area identified with the latter page area addresses and the page length corresponding to the two or more management information pages.

* * * * *